US012443814B2

(12) United States Patent
Tai et al.

(10) Patent No.: US 12,443,814 B2
(45) Date of Patent: Oct. 14, 2025

(54) TECHNIQUES FOR MANAGING ANIMATED CODES

(71) Applicant: Apple Inc., Cupertino, CA (US)

(72) Inventors: Yuan Yen Tai, Pleasanton, CA (US); Xiaoyuan Gu, Orinda, CA (US); Brian Knott, New York, NY (US); Dayvid Victor Rodrigues De Oliveira, Round Rock, TX (US); Jia Huang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/468,646

(22) Filed: Sep. 15, 2023

(65) Prior Publication Data
US 2024/0403587 A1 Dec. 5, 2024

Related U.S. Application Data

(60) Provisional application No. 63/506,055, filed on Jun. 2, 2023.

(51) Int. Cl.
*G06K 7/14* (2006.01)
*G06T 7/10* (2017.01)
(Continued)

(52) U.S. Cl.
CPC ............. *G06K 7/1417* (2013.01); *G06T 7/10* (2017.01); *G06T 9/00* (2013.01); *G06T 13/80* (2013.01)

(58) Field of Classification Search
CPC ........... G06K 7/1417; G06T 7/10; G06T 9/00; G06T 13/80
(Continued)

(56) References Cited

U.S. PATENT DOCUMENTS 5,412,194 A * 5/1995 Melbye ............... G11B 23/046
235/487
5,691,527 A 11/1997 Hara et al.
(Continued)

FOREIGN PATENT DOCUMENTS

EP 1847945 B1 4/2017
JP 2867904 B2 3/1999
(Continued)

OTHER PUBLICATIONS

International Patent Application No. PCT/US2024/028145—International Search Report and Written Opinion dated Sep. 23, 2024.
(Continued)

*Primary Examiner* — Daniel A Hess
(74) *Attorney, Agent, or Firm* — DICKINSON WRIGHT RLLP

(57) ABSTRACT

The embodiments set forth techniques for encoding information into animated codes. The techniques can include the steps of (1) receiving a request to generate an animated code based on the input data, (2) generating a sequence of visual elements based on the input data, (3) separating the sequence of visual elements into a plurality of visual element groups based on a number of containers that are simultaneously displayed within the animated code, (4) generating a sequence of frames for the animated code, where each frame includes a successive and respective visual element group of the plurality of visual element groups, and the visual elements in the respective visual element group are formatted in accordance with the containers, (5) compiling the sequence of frames to produce the animated code, and (6) integrating the animated code into at least one media item for display on at least one display device.

18 Claims, 20 Drawing Sheets
(15 of 20 Drawing Sheet(s) Filed in Color)

Step 5 – Server device identifies that the animated code simultaneously displays two containers

(51) Int. Cl.
*G06T 9/00* (2006.01)
*G06T 13/80* (2011.01)

(58) Field of Classification Search
USPC .................................................. 235/462.1
See application file for complete search history.

(56) References Cited

U.S. PATENT DOCUMENTS

| | | | |
|---|---|---|---|
| 5,726,435 | A | 3/1998 | Hara et al. |
| 7,032,823 | B2 | 4/2006 | Nojiri |
| 9,600,701 | B1 | 3/2017 | Chien et al. |
| 9,865,027 | B2 | 1/2018 | Arce et al. |
| 10,089,508 | B2 | 10/2018 | Arce et al. |
| 2013/0021364 | A1 | 1/2013 | Azuma et al. |
| 2016/0342875 | A1 | 11/2016 | Annamalai et al. |
| 2017/0076127 | A1 | 3/2017 | Arce et al. |
| 2019/0215063 | A1 | 7/2019 | Darabi |
| 2020/0168253 | A1 | 5/2020 | Shah et al. |
| 2020/0279454 | A1* | 9/2020 | Meyer ............... G07F 17/326 |
| 2023/0106011 | A1 | 4/2023 | Marin et al. |
| 2023/0143357 | A1* | 5/2023 | Sanderson .......... G06Q 20/204 235/494 |

FOREIGN PATENT DOCUMENTS

| | | |
|---|---|---|
| JP | 2938338 B2 | 8/1999 |
| JP | 3716527 B2 | 11/2005 |
| JP | 3726395 B2 | 12/2005 |
| JP | 3843595 B2 | 11/2006 |
| JP | 3996520 B2 | 10/2007 |
| WO | 2005116916 A1 | 8/2005 |

OTHER PUBLICATIONS

Van Der Westhuizen et al., "3D Dynamic Barcode", Electronics Letters, the Institution of Engineering and Technology, GB, vol. 54, No. 17, Aug. 23, 2018 (Aug. 23, 2018), pp. 1024-1026, ISSN: 0013-5194, DOI: 10.1049/EL.2017.4385, the whole document.

* cited by examiner

Step 1 – Server device receives a request to generate an animated code for the string "ao.wmcnwidmow."

Step 2 – Server device accesses a mapping table that links characters to respective unique colors Step 3 – Server device maps each character of the string "ao.wmcnwidmow." to the mapping table Step 5 – Server device identifies that the animated code simultaneously displays two containers
Color Sequence 204
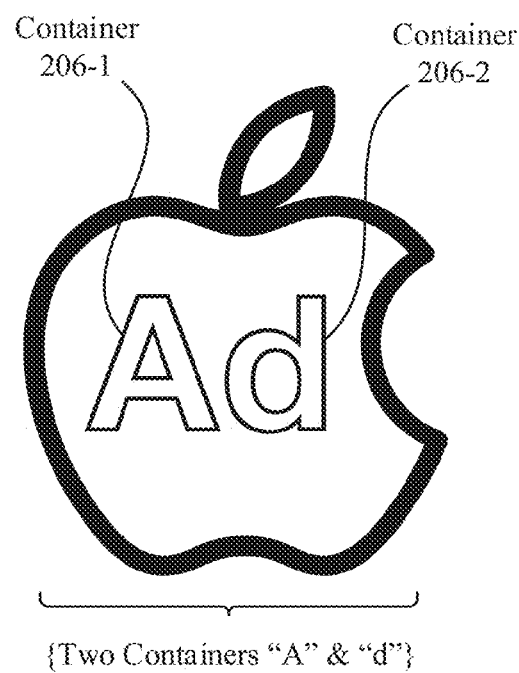
Container 206-1
Container 206-2
{Two Containers "A" & "d"}
FIG. 2E Step 6 – Server device segments the color sequence into groups of two Step 10 – Client device detects and observes the animated code using at least one sensor Step 12 – Client device determines that the animated code simultaneously displays two containers and generates a color sequence based on the frames Step 13 – Client device provides the color sequence to a mapping table to obtain the string "ao.wmcnwidmow."

Step 14 – Client device issues a request to receive content associated with the string "ao.wmcnwidmow."

Step 15 – The server device performs a lookup of the string and returns the associated content Step 16 – The client device displays and enables features associated with the content

TECHNIQUES FOR MANAGING ANIMATED CODES

CROSS-REFERENCE TO RELATED APPLICATIONS

The present application claims the benefit of U.S. Provisional Application No. 63/506,055, entitled "TECHNIQUES FOR MANAGING ANIMATED CODES," filed Jun. 2, 2023, the content of which is incorporated by reference herein in its entirety for all purposes.

FIELD

The described embodiments relate generally to managing animated codes. More particularly, the described embodiments provide techniques for encoding information into animated codes, as well as decoding information from the animated codes.

BACKGROUND

Scannable codes, such as barcodes, quick response (QR) codes, etc., offer many benefits that have contributed to their widespread adoption and integration into various aspects of our daily lives. For example, with the capacity to encode thousands of characters, QR codes can convey extensive details such as website uniform resource locators (URLs), contact information, product specifications, and more. Scanning a QR code typically requires a computing device that is equipped with a QR code reader app, which is readily available for free on most platforms. This accessibility makes it easy for users to interact with QR codes and instantly access the information contained therein. In this manner, QR codes are highly versatile in that businesses and individuals can efficiently share complex data through simple scans using their personal computing devices.

Unfortunately, QR codes continue to suffer from a number of deficiencies that have yet to be addressed. In particular, QR codes must be displayed at a sufficient resolution—and size—for computing devices to properly detect and interpret the QR codes. This can be problematic when QR codes are displayed on display devices such as televisions, computer monitors, and the like. For example, when a QR code is displayed on a low-resolution display, the overall size of the QR code must be increased for it to be readable, which can obstruct the view of any underlying media content. Conversely, when a QR code is displayed on a high-resolution display, the overall size of the QR code is inherently decreased, which can strain the ability of computing devices to effectively detect the QR code. Moreover, QR codes are fixed in nature, which can make it difficult for them to draw attention from individuals.

Accordingly, it is desirable to provide a new type of scannable code that addresses the foregoing deficiencies.

SUMMARY

The described embodiments relate generally to managing animated codes. More particularly, the described embodiments provide techniques for encoding information into animated codes, as well as decoding information from the animated codes.

One embodiment sets forth a method for encoding information into animated codes. According to some embodiments, the method can be implemented by a server computing device, and includes the steps of (1) receiving a request to generate an animated code based on input data, (2) generating a sequence of visual elements based on the input data, (3) separating the sequence of visual elements into a plurality of visual element groups based on a number of containers that are simultaneously displayed within the animated code, (4) generating a sequence of frames for the animated code, where each frame includes a successive and respective visual element group of the plurality of visual element groups, and the visual elements in the respective visual element group are formatted in accordance with the containers, (5) compiling the sequence of frames to produce the animated code, and (6) integrating the animated code into at least one media item for display on at least one display device.

Another embodiment sets forth a method for decoding information from animated codes. According to some embodiments, the method can be implemented by a client computing device, and includes the steps of (1) gathering information about an animated code that is detectable using at least one sensor that is communicatively coupled with the client computing device, (2) separating the information into a sequence of frames, where each frame includes a successive and respective visual element group of a plurality of visual element groups, and the visual elements in the respective visual element group are formatted in accordance with containers that are simultaneously displayed within the animated code, (3) extracting a sequence of visual elements from the plurality of visual element groups, (4) generating output data based on the sequence of visual elements, and (5) performing at least one action based on the output data.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description, and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments relate generally to managing animated codes. More particularly, the described embodiments provide techniques for encoding information into animated codes, as well as decoding information from the animated codes.

A more detailed discussion of these techniques is set forth below and described in conjunction with FIGS. 1, 2A-2P, and 3-5, which illustrate detailed diagrams of systems and methods that can be used to implement these techniques.

Figure 1:
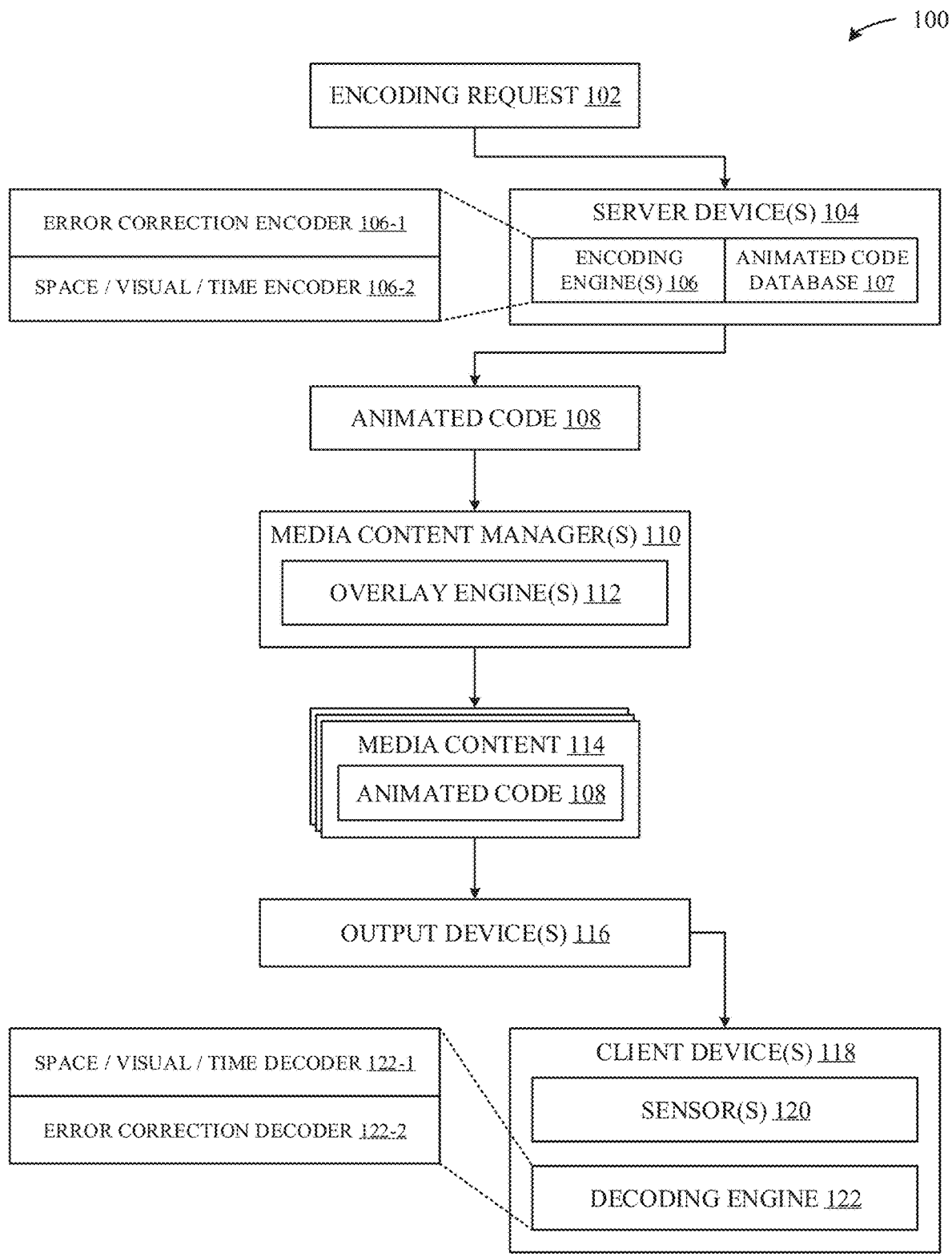
FIG. 1 illustrates a system diagram of a computing device that can be configured to perform the various techniques described herein, according to some embodiments.

FIG. 1 illustrates a block diagram of different components of a system 100 that can be configured to implement the various techniques described herein, according to some embodiments. As shown in FIG. 1, the system 100 can include server computing devices 104, media content managers 110, output devices 116, and client computing devices 118. According to some embodiments, the server computing devices 104 can include one or more encoding engines 106 that are configured to generate animated codes 108 in accordance with the techniques described herein. The server computing devices 104 can also access an animated code database 107 that associates animated codes 108—specifically, information encoded within the animated codes 108, such as unique identifiers—with any type of content information. The content information can include, for example, uniform resource locators (URLs), media content, application content (e.g., to be interpreted and utilized by applications executing on the client computing devices 118), and so on. It is noted that the foregoing examples are not meant to be limiting, and that any type, size, etc., of content information, at any level of granularity, can be associated with a given animated code 108 without departing from the scope of this disclosure.

As a brief aside, it is noted that the animated code database 107 can be managed in any capacity that enables the animated code database 107 to be accessible to the server computing devices 104 and the client computing devices 118. For example, one or more of the server computing devices 104 can manage the animated code database 107 and make the animated code database 107 accessible to other non-managing server computing devices 104 and the client computing devices 118. In another example, the animated code database 107 can be managed by one or more other computing devices (not illustrated in FIG. 1) that are communicatively coupled with the server computing devices 104 and the client computing devices 118. In any case—and, as described in greater detail herein—the client computing devices 118 can access (or request a managing device to access) the animated code database 107 to lookup content information associated with animated codes 108 that are scanned/decoded by the client computing devices 118.

As shown in FIG. 1, the server computing devices 104 can be configured to receive encoding requests 102. The encoding requests 102 can be issued by any entity—e.g., a company, an individual, etc.—that desires to have an animated code 108 generated on their behalf. Under a simple/ standardized approach, a given encoding request 102 can include content information to be associated with an animated code 108 that is generated by the server computing device 104 (e.g., using default properties). In particular, a server computing device 104 can generate a unique identifier (e.g., a string) for the animated code 108, generate the animated code 108 based on the unique identifier (i.e., such that the unique identifier is encoded within the animated code 108), and establish, within the animated code database 107, an association between the content information and the unique identifier. In this manner, client computing devices 118 can, in conjunction with scanning/decoding the animated code 108, extract the unique identifier, and then perform (or request) a lookup within the animated code database 107 for the content information that is associated with the unique identifier.

Under a more complex/customized approach, a given encoding request 102 can include selections/specifications that are commensurate with a level of customization that is permitted by the server computing devices 104 with respect to generating animated codes 108. For example, in lieu of providing the aforementioned content information, a given entity may be permitted to provide intrinsic information (e.g., a URL, contact information, media content, etc.) to be encoded into the animated code 108. Under such an approach, client computing devices 118 that scan the animated code 108 and decode the intrinsic information can immediately act on the intrinsic information (e.g., with or without performing a lookup request to obtain associated content information stored in the animated code database 107). The entity may also be permitted to specify one or more properties that the animated code 108 should possess, such as the size, design, layout, number of containers (which will be described in greater detail), and so on. It is noted that the foregoing example properties are not meant to be limiting, and that any property of the animated code 108, at any level of granularity, can be modifiable without departing from the scope of this disclosure.

As a brief aside, it is noted that the animated code 108 can include instructional information that conveys whether the encoded information should provoke client computing devices 118 to act on the encoded information itself and/or should interface with the animated code database 107 obtain (and act on) associated content information. For example, if the encoded information of a given animated code 108 constitutes intrinsic information—such as a complete URL that can be accessed, for example, by web browsers on client computing devices 118—then the animated code 108 can include encoded information that indicates the client computing devices 118 should act on the intrinsic information in conjunction with decoding it. If the encoded information of a given animated code 108 constitutes a unique identifier (generated, for example, in accordance with the simple/ standardized approach described above) that in and of itself is not actionable—and instead is associated with content information that is actionable—then the animated code 108 can include encoded information that indicates the client computing devices 118 should interface with the animated code database 107 to perform a lookup of the content information that is linked to the unique identifier. In turn, the client computing devices 118 can act on the content information. For example, if the content information is a media content clip (e.g., an audio file), then the client computing devices 118 can play the media content clip through media applications installed on the client computing devices 118.

Additionally, it is noted that the client computing devices 118 can be configured to parse information decoded from a given animated code 108 to independently determine how to proceed. In particular, the client computing devices 118 can be configured to analyze the information to determine whether it constitutes a unique identifier or intrinsic information. For example, the client computing devices 118 can implement string tokenizers/analyzers to identify markers within the information to effectively determine an appropriate action to take on the information. For example, a given string tokenizer can be configured to identify URL-specific sequence of characters within the information encoded within a given animated code—such as "www", "http://", and so on—and, in response to identifying such sequences, provide the information to a web browser application available on the client computing device 118. In this regard, when the client computing devices 118 possess the aforementioned analytical capabilities, the instructional information can be disregarded by the client computing devices 118 and/or omitted from the animated codes 108.

According to some embodiments, each encoding request 102 received by a server computing device 104 can be provided to an encoding engine 106. As shown in FIG. 1, each encoding engine 106 can include an error-correction encoder 106-1 and a space/visual/time encoder 106-2. According to some embodiments, the error-correction encoder 106-1 can be configured to implement any error correction approach that increases the ability for data to be correctly and effectively communicated between computing devices. For example, the error-correction encoder 106-1 can implement forward error correction (FEC), channel coding, etc., to mitigate errors that may arise when animated codes 108 are scanned by the client computing devices 118. In this regard, information that is to be encoded into an animated code 108—such as a unique identifier, intrinsic information (e.g., a URL), etc.—can be modified to incorporate error-correction information. In turn, when a given client computing device 118 decodes the information from the animated code 108, the client computing device 118 can utilize the error-correction information to correct errors, if any, included in the information, and then remove the error-correction information.

According to some embodiments, the space/visual/time encoder 106-2 can be configured to perform a series of steps that generate an animated code 108 into which the information is encoded. As described in greater detail herein, the space/visual/time encoder 106-2 can be configured to generate a sequence of visual elements (e.g., shades, colors, patterns, textures, designs, etc.) based on the information. In particular, the space/visual/time encoder 106-2 can be configured to segment the information into a plurality of segments, and map each segment of the plurality of segments to a respective visual element that corresponds to the segment. For example, when the information is represented in a string form (i.e., a string of characters), then each segment of the plurality of segments can constitute a respective character in the string of characters, such that each unique character correlates to a respective unique visual element. It is noted that a more detailed description of the visual elements is provided below in conjunction with FIGS. 2A-2P.

Next, the space/visual/time encoder 106-2 can be configured to separate the sequence of visual elements into a plurality of visual element groups based on a number of containers that are simultaneously displayed within the animated code 108. According to some embodiments, a container can represent a shape, a symbol, etc., displayed within the animated code 108 that can be modified to reflect the visual elements described herein. Next, the space/visual/time encoder 106-2 can be configured to generate a sequence of frames for the animated code 108, where each frame includes a successive and respective visual element group of the plurality of visual element groups, and where the visual elements in the respective visual element group are formatted in accordance with the containers. In turn, the space/visual/time encoder 106-2 can compile the sequence of frames to produce the animated code 108. The space/visual/time encoder 106-2 can also include information in the animated code 108 that causes the animated code 108 to play in a loop, which beneficially provides an increased amount of time for users/client computing devices 118 to observe and scan the animated code 108, respectively. According to some embodiments, a given client computing device 118 can be configured to identify a starting and ending point of the loop by comparing frames of a given animated code 108 to identify overlaps. Alternatively (or additionally), starting/ ending point information can be encoded into the animated codes 108 to effectively indicate to the client computing devices 118 when the animated code 108 is entering into a new loop. It is noted that a more detailed breakdown of the manner in which the space/visual/time encoder 106-2 is provided below in conjunction with FIGS. 2A-2P.

As shown in FIG. 1, the server computing device 104 can provide the animated code 108 to one or more media content managers 110. According to some embodiments, a given media content manager 110 can represent any number of entities (e.g., marketing entities, distribution entities, etc.) that are involved in, responsible for, etc., the management of media content 114. As shown in FIG. 1, each media content manager 110 can implement one or more overlay engines 112 capable of integrating animated codes 108 into media content 114. For example, a given media content manager 110 can utilize an overlay engine 112 to integrate (i.e., overlay, embed, etc.) the animated code 108 into movies, television shows, sports broadcasts, video games, advertisements, and so on. The media content 114 (into which the animated code 108 is embedded) can then be provided to output devices 116 that are capable of displaying the media content 114. The output devices 116 can include, for example, computing device displays, television displays, electronic billboard displays, movie theatre screens, electronic ink displays, and the like. It is noted that the foregoing examples are not meant to be limiting, and that any display device capable of displaying the media content 114/animated codes 108 can be utilized without departing from the scope of this disclosure.

When the output devices 116 display media content 114 into which animated codes 108 are integrated, individuals can utilize their client computing devices 118 to access the features contained within the animated codes 108. To achieve this end, the client computing devices 118 can include one or more sensors 120 that enable the client computing devices 118 to effectively scan the animated codes 108 for decoding. The sensors can include any number, type, etc. of components that effectively enable a sequence of frames to be captured, such as a charged-coupled device (CCD) of a digital camera component, hardware components that enable the CCD to provide image/video capture techniques, and so on. According to some embodiments, the client computing devices 118 can implement hardware and/or software-based logic that analyzes the sequence of frames to effectively determine that an animated code 108 is included within the sequence of frames. For example, the logic can determine that an animated code 108 is being observed by the sensor(s) 120 when the logic (1) identifies a shape that is included in each of the frames and that encapsulates, is positioned proximately to, etc., at least one container, and/or (2) identifies that the properties (e.g., shades, colors, patterns, textures, designs, etc.) of the at least one container are fluctuating as time passes. It is noted that the logic can be configured to identify the aforementioned containers independent of the aforementioned shape without departing from the scope of this disclosure. In this manner, the animated codes 108 can be customized at a finer level of granularity, e.g., to include different shapes that can encapsulate, be positioned proximately to, etc., the at least one container.

Additionally, the logic can be configured to process the sequence of frames using a variety of techniques. For example, the logic can be configured to remove extraneous data from the frames that is inconsequential to the interpretation of the animated code 108. In particular, the logic can be configured to carve out the portions of the frames that constitute the animated code 108, which reduces the amount of storage space/transmission bandwidth involved in managing (e.g., storing, transmitting, etc.) the sequence of frames. The logic can also be configured to perform various adjustments to the frames, including sharpening the frames, rotating the frames, color correcting the frames, compressing the frames, and so on. Such processing techniques can yield an enhanced sequence of frames that can improve the overall accuracy and efficiency by which the decoding engine 122 is able to decode the information from the animated code 108.

The client computing devices 118 can also implement a decoding engine 122 that is configured to decode the animated codes 108 that are scanned by the sensor(s) 120. As shown in FIG. 1, the decoding engine 122 can include a space/visual/time decoder 122-1 and an error correction decoder 122-2. As described herein, the space/visual/time decoder 122-1 can effectively perform the inverse functionality of the space/visual/time encoder 106-2. This can involve, for example, the space/visual/time decoder 122-1 detecting, within each frame of the sequence of frames (provided by the sensors 120, as described above), a successive and respective visual element group of a plurality of visual element groups, where the visual elements in the respective visual element group are formatted in accordance with containers that are simultaneously displayed within the animated code 108. In turn, the space/visual/time decoder 122-1 can extract a sequence of visual elements from the plurality of visual element groups, and generate output data (i.e., a unique identifier or intrinsic information) based on the sequence of visual elements.

Additionally, the error detection decoder 122-2 can effectively perform the inverse functionality of the error correction encoder 106-1, i.e., the error detection decoder 122-2 can identify error correction information included in the output data. In turn, the error detection decoder 122-2 can utilize the error correction information to remove any errors identified within the output data, and subsequently remove the error correction information from the output data. The client computing device 118 can then utilize the output data to perform the appropriate action associated with the output data. This can include, for example, looking up content information (via the animated code database 107 described herein) associated with the output data (when the output data represents a unique identifier), acting on the output data when the output data constitutes intrinsic information (e.g., a URL), and so on. It is noted that the foregoing actions are not mutually exclusive, and that the animated code 108 can include intrinsic information that is also linked to content information. For example, such an animated code 108 can cause client computing devices 118 to (1) act on the intrinsic information, and (2) perform a lookup of content information associated with the intrinsic information, and then act on the content information as well.

It should be understood that the various components of the computing devices illustrated in FIG. 1 are presented at a high level in the interest of simplification. For example, although not illustrated in FIG. 1, it should be appreciated that the various computing devices can include common hardware/software components that enable the above-described software entities to be implemented. For example, each of the computing devices can include one or more processors that, in conjunction with one or more volatile memories (e.g., a dynamic random-access memory (DRAM)) and one or more storage devices (e.g., hard drives, solid-state drives (SSDs), etc.), enable the various software entities described herein to be executed. Moreover, each of the computing devices can include communications components that enable the computing devices to transmit information between one another.

A more detailed explanation of these hardware components is provided below in conjunction with FIG. 5. It should additionally be understood that the computing devices can include additional entities that enable the implementation of the various techniques described herein without departing from the scope of this disclosure. It should additionally be understood that the entities described herein can be combined or split into additional entities without departing from the scope of this disclosure. It should further be understood that the various entities described herein can be implemented using software-based or hardware-based approaches without departing from the scope of this disclosure.

Accordingly, FIG. 1 provides an overview of the manner in which the system 100 can implement the various techniques described herein, according to some embodiments. A more detailed breakdown of the manner in which these techniques can be implemented will now be provided below in conjunction with FIGS. 2A-2P and 3-4.

Figure 2A:
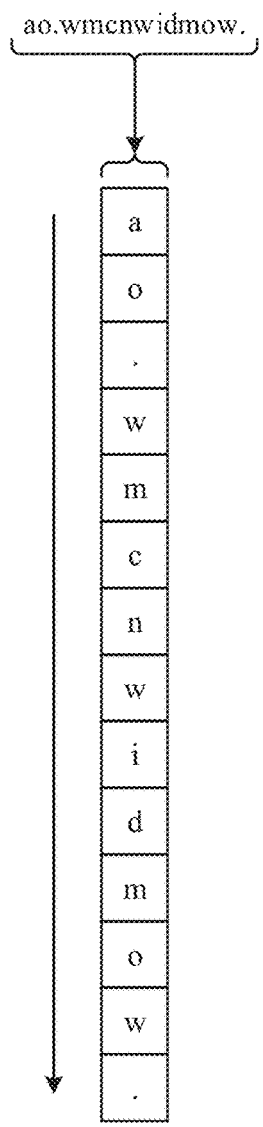
FIGS. 2A-2P illustrate conceptual diagrams of techniques for encoding information into animated codes, as well as decoding information from the animated codes, according to some embodiments.
Figure 2B:
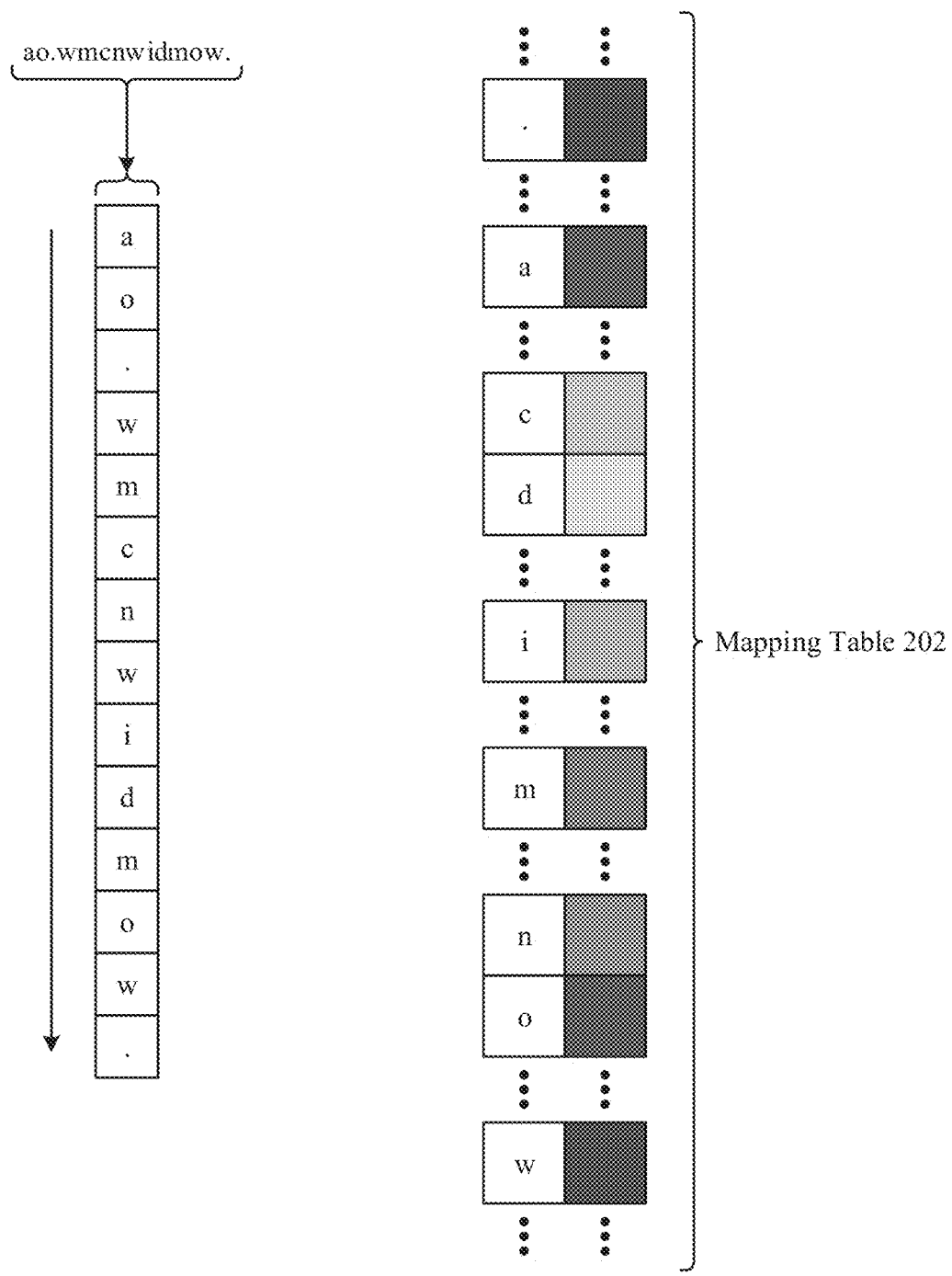
Figure 2C:
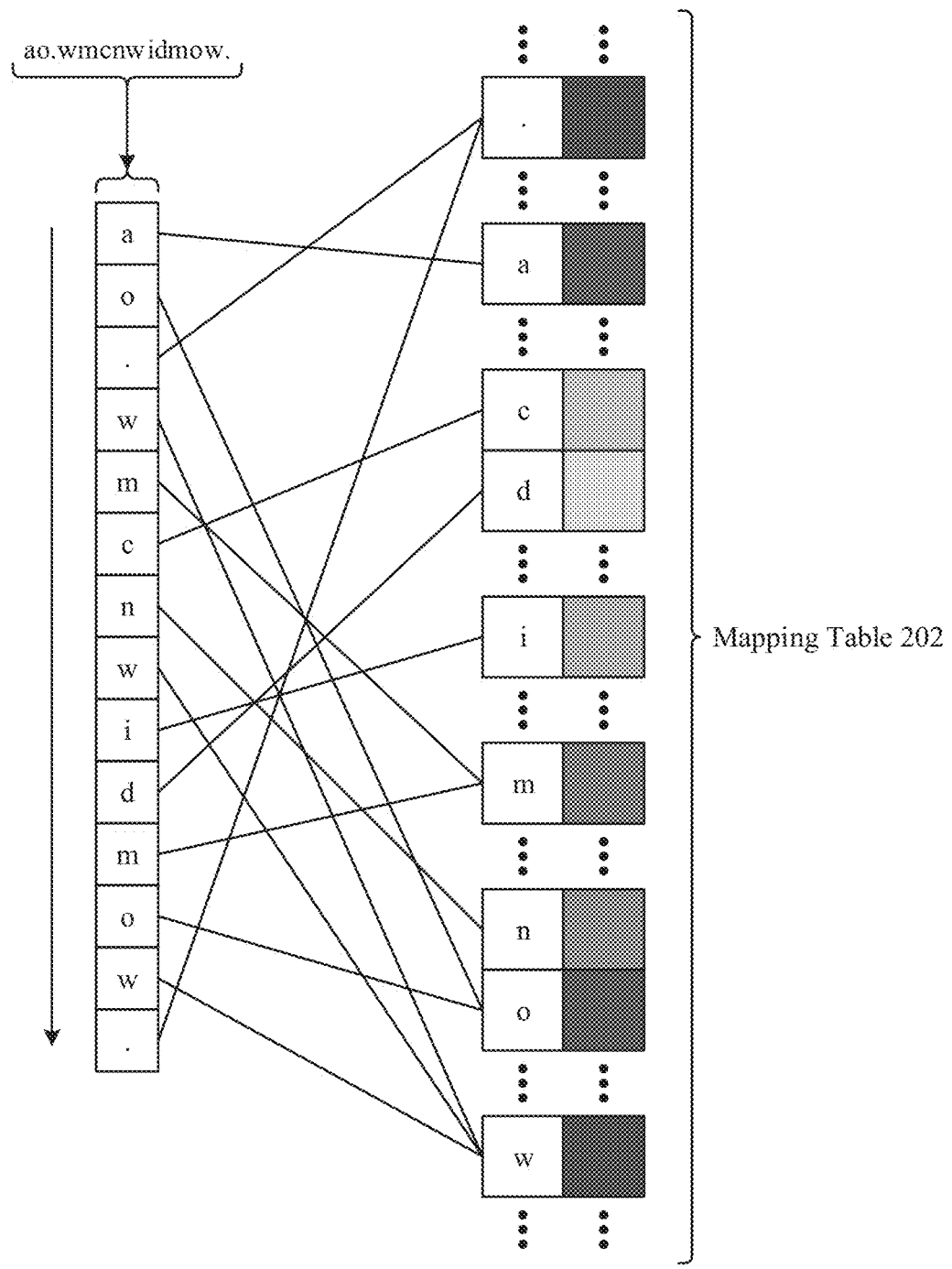
Figure 2D:
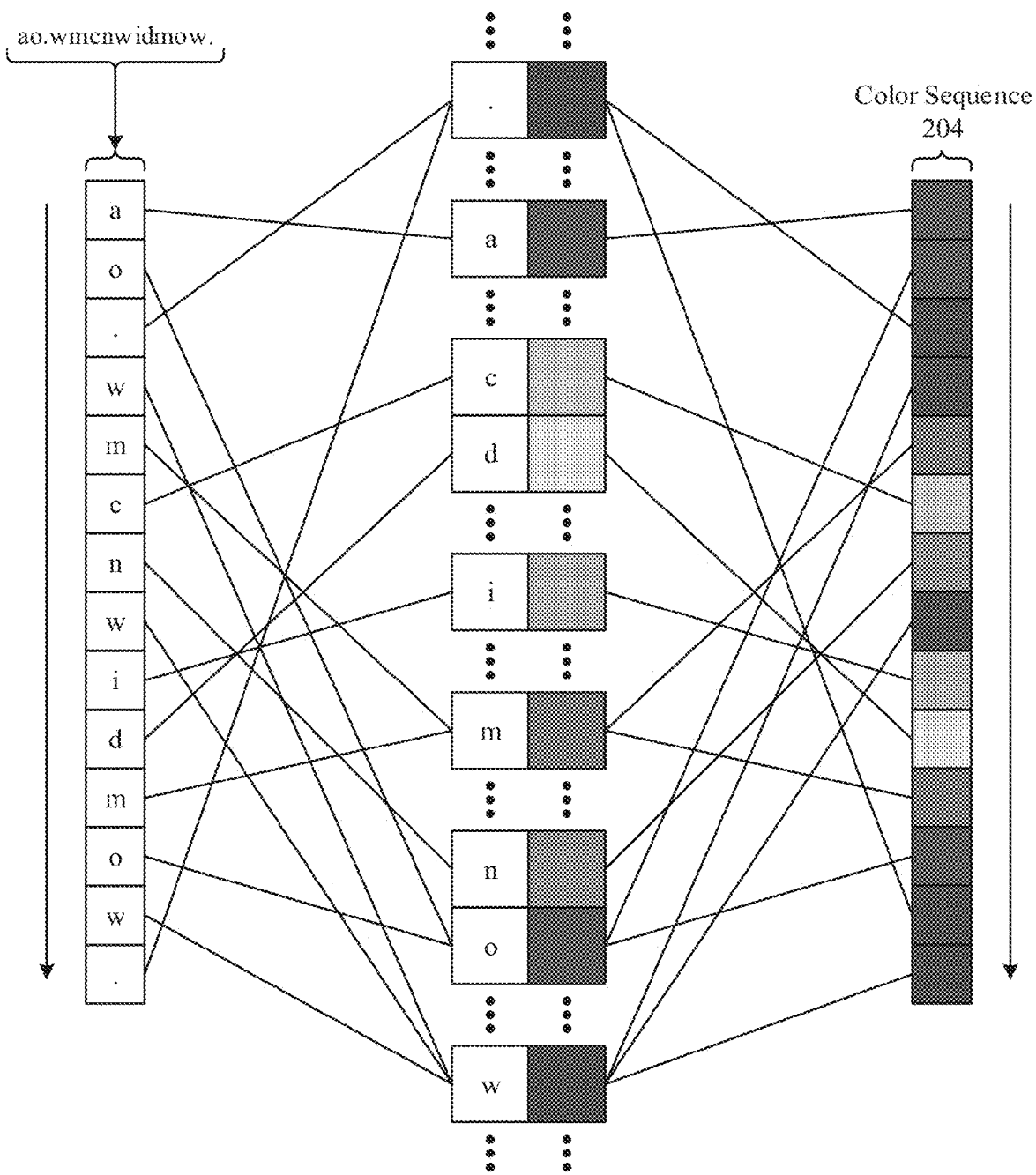
Figure 2F:
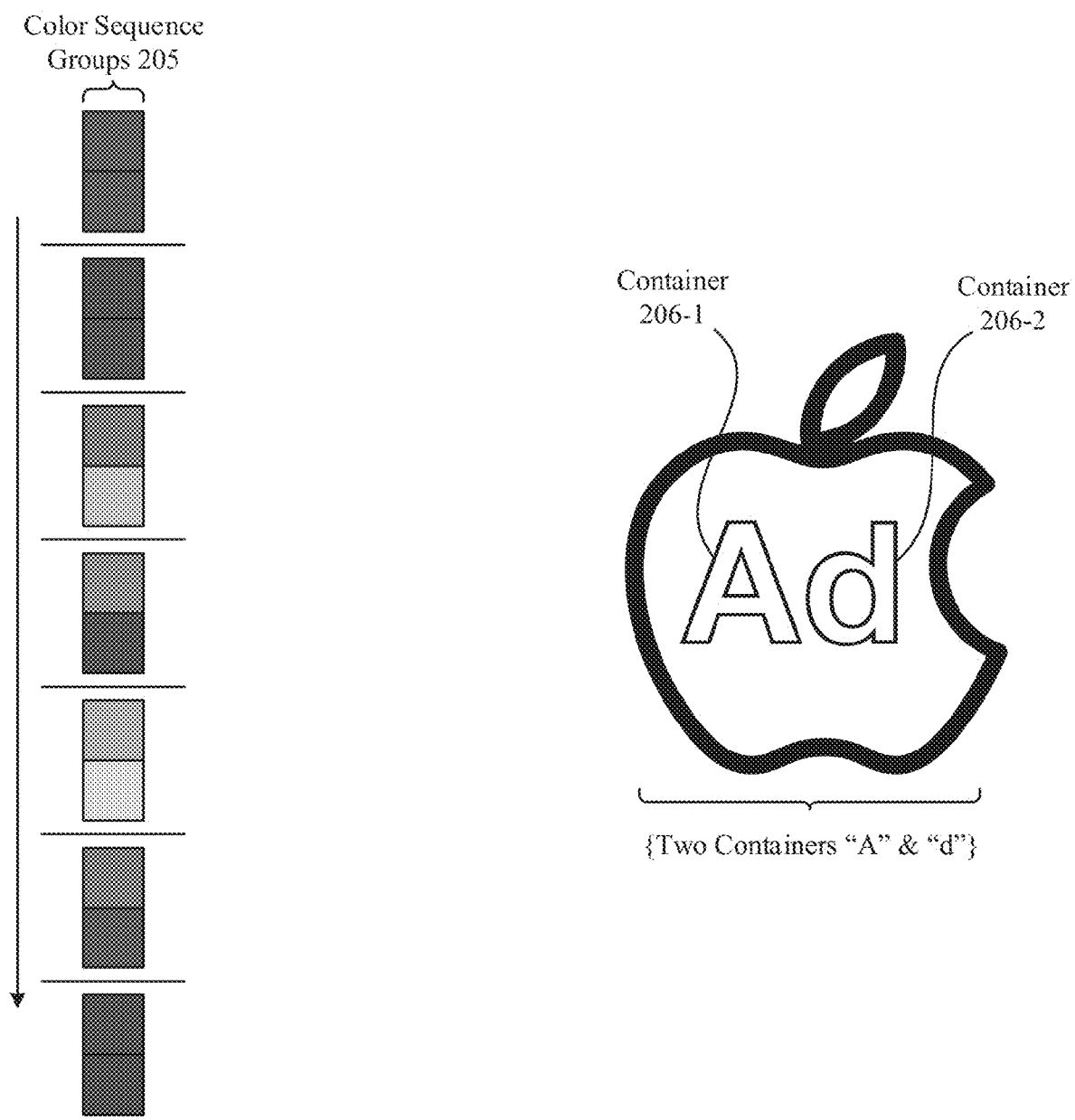
Figure 2G:
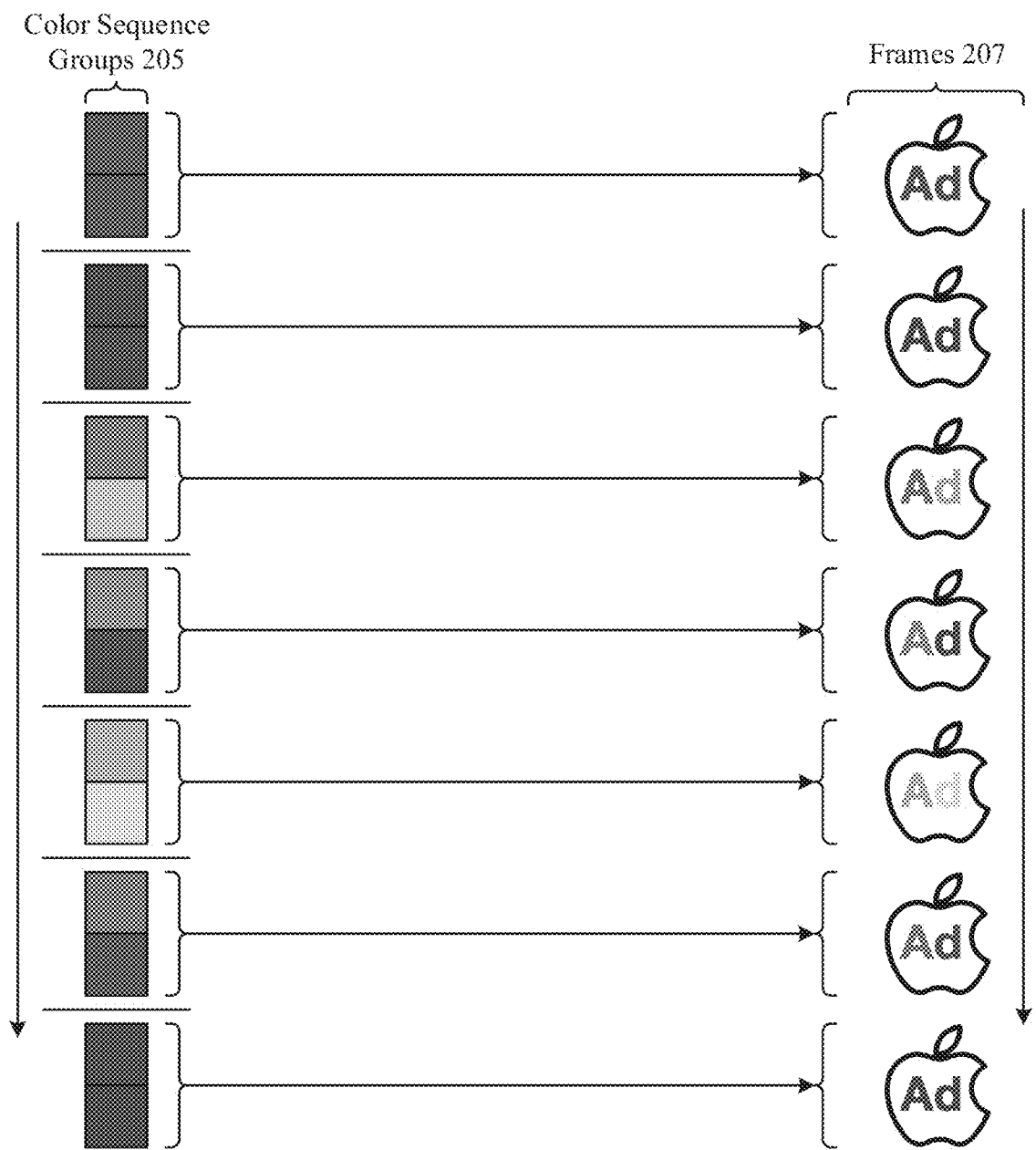
Figure 2H:
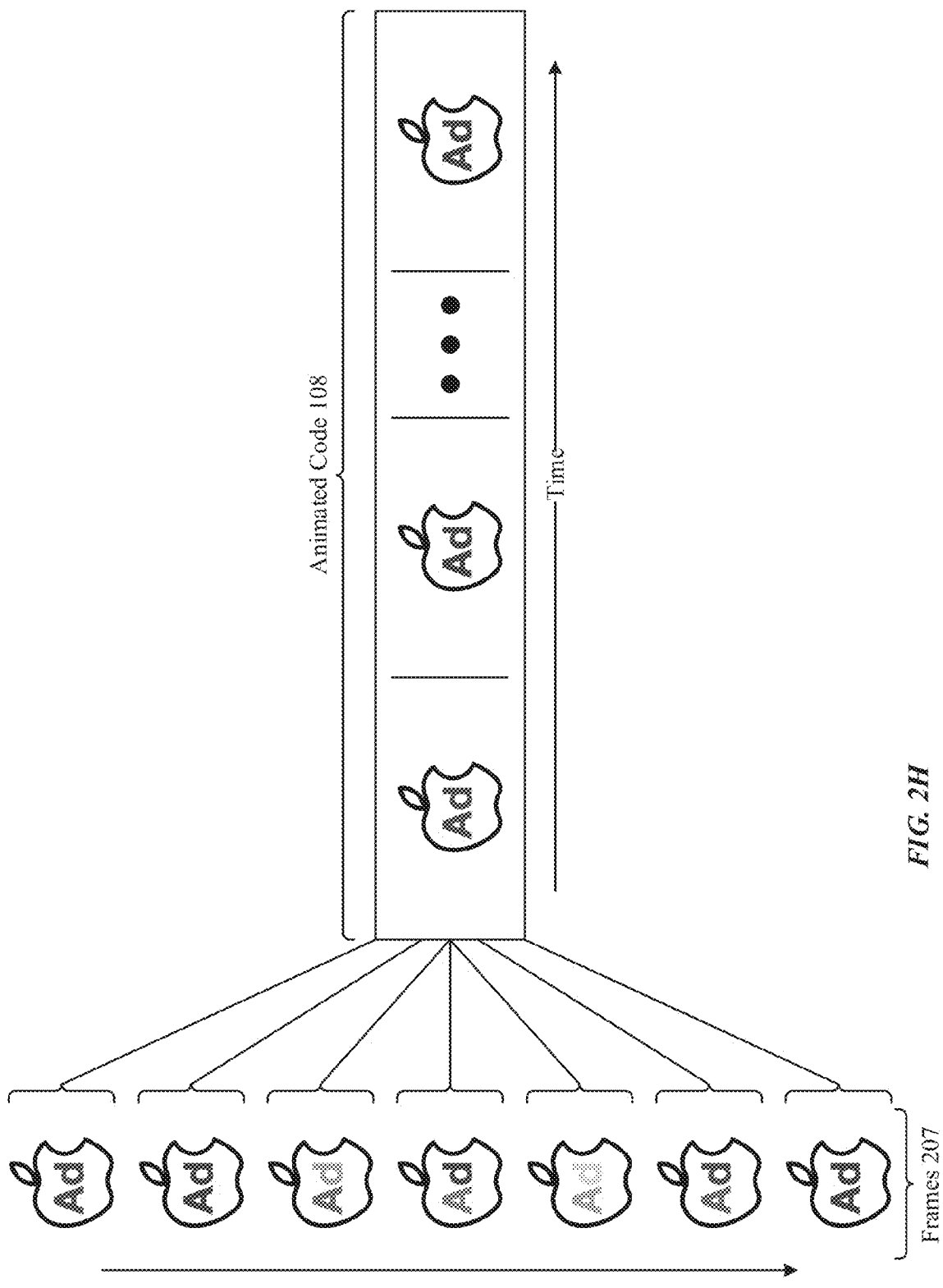
Figure 21:
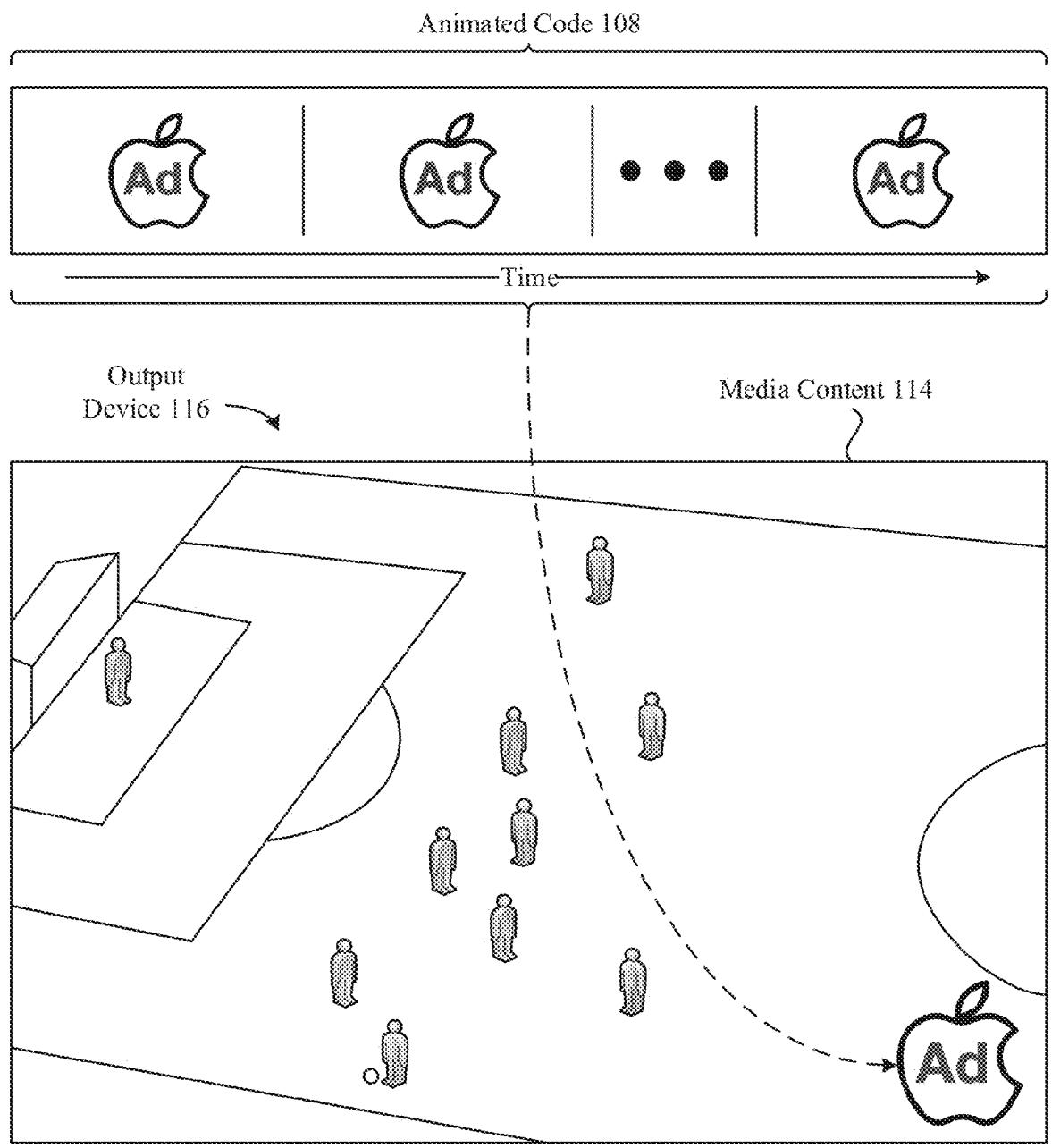
Figure 2J:
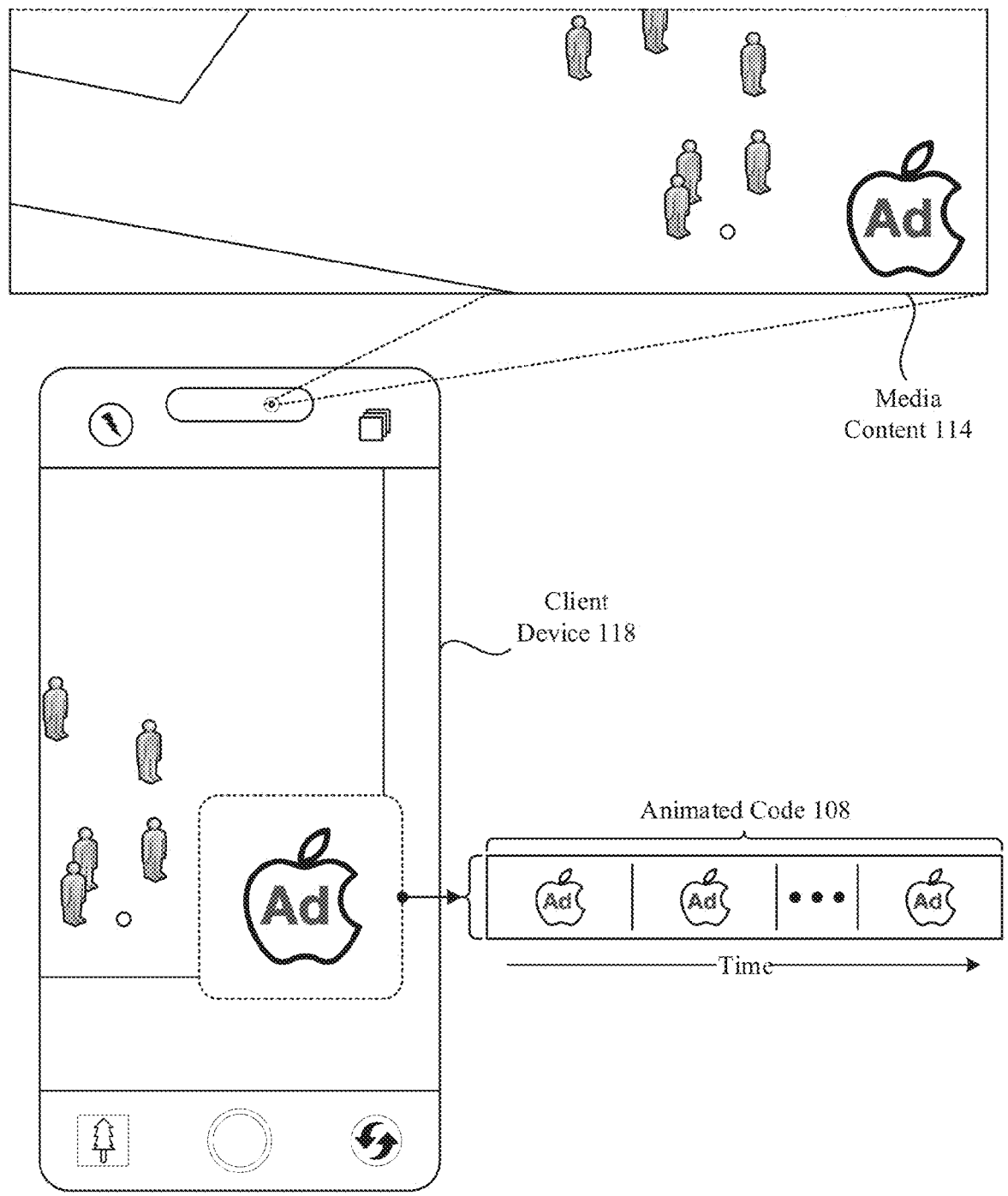
Figure 2K:
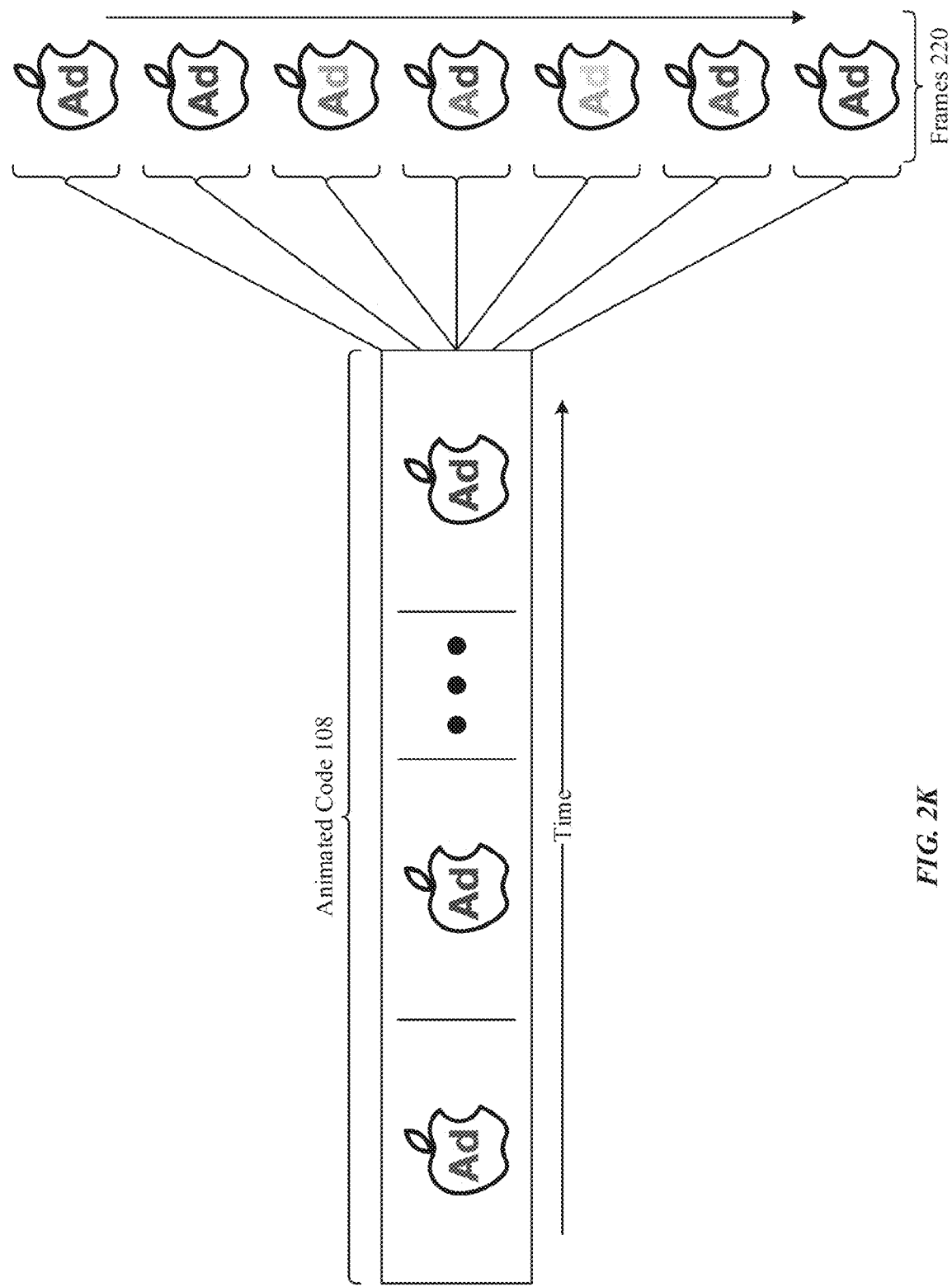
Figure 2L:
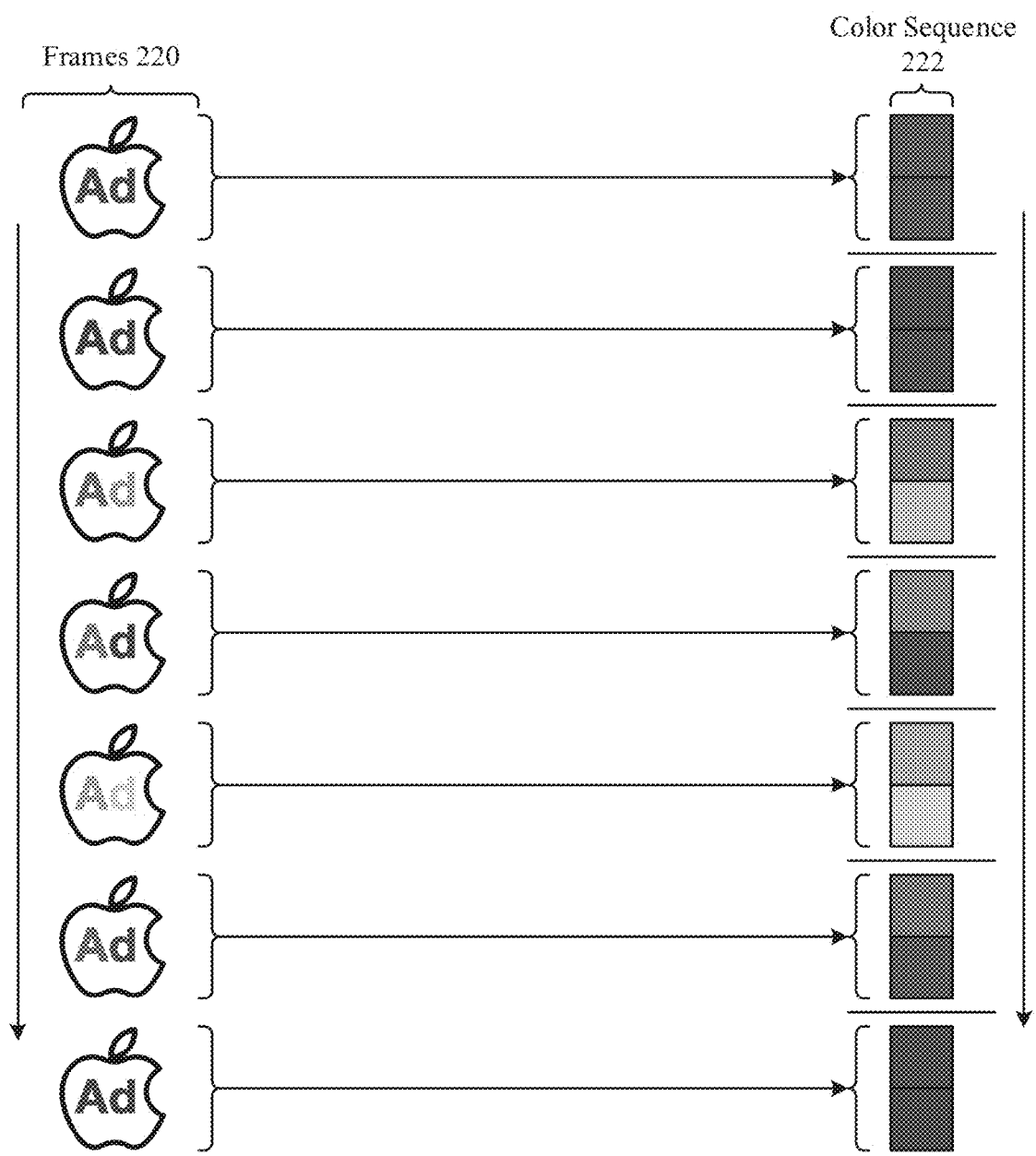
Figure 2M:
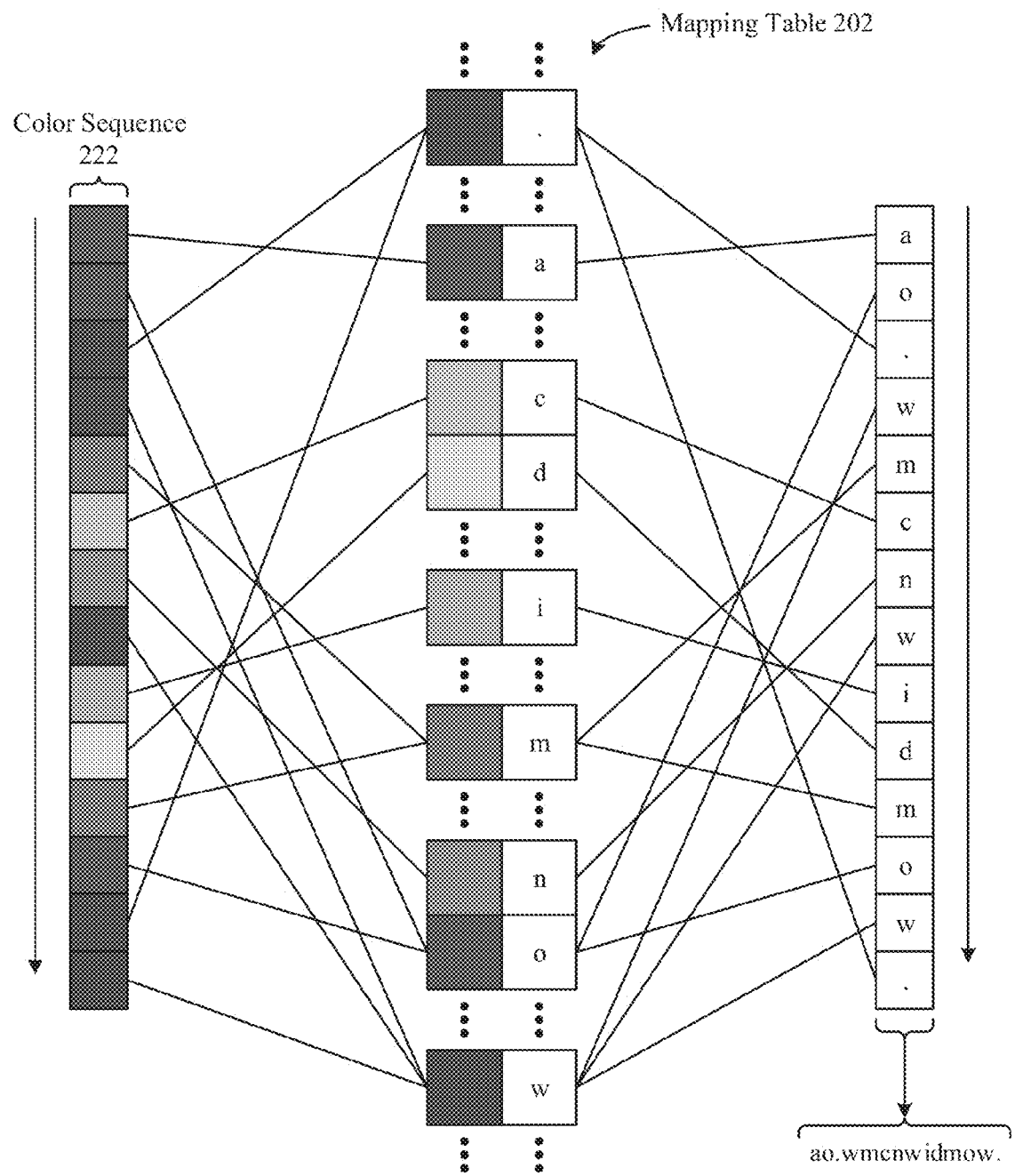
Figure 2N:
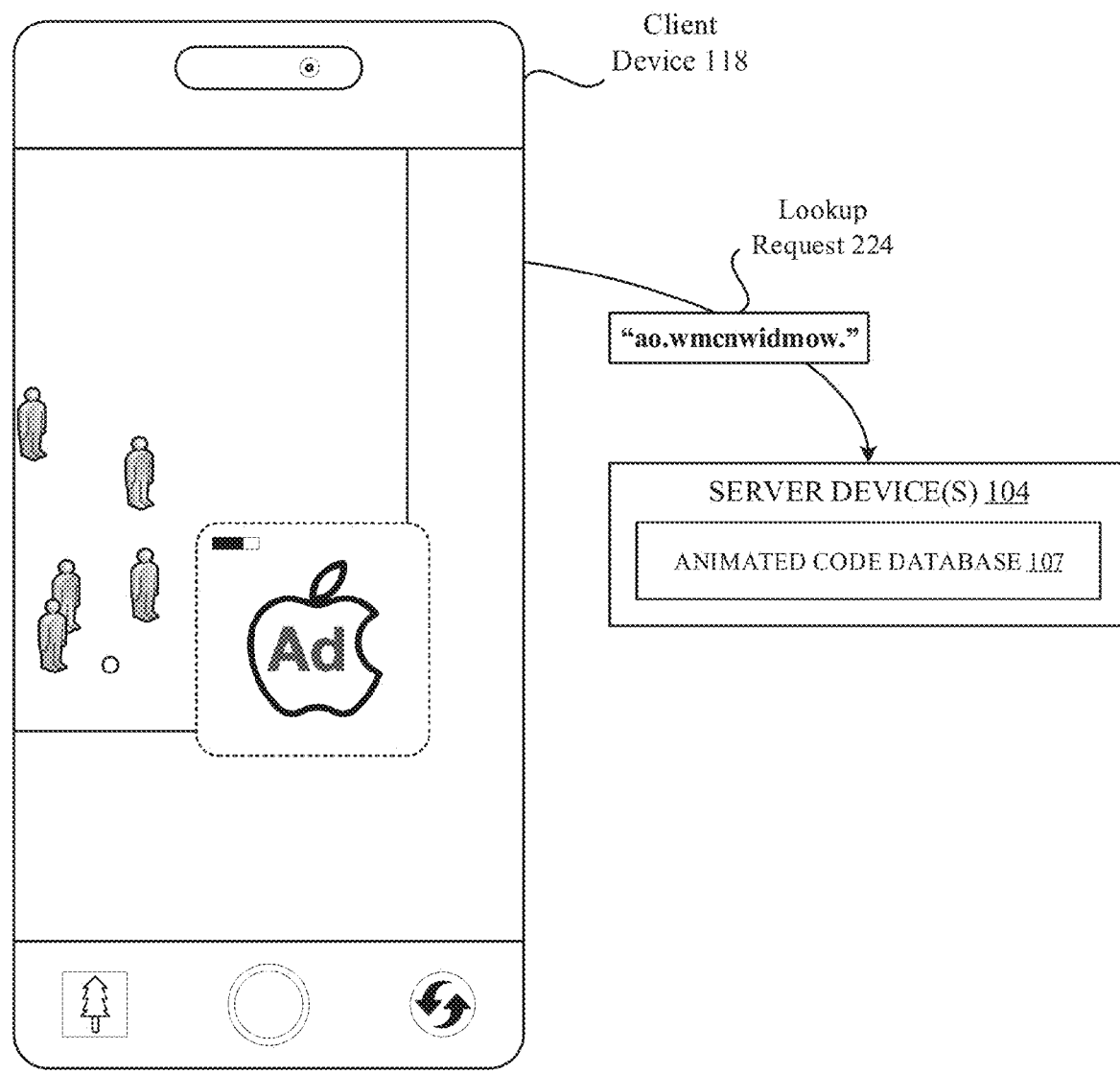
Figure 20:
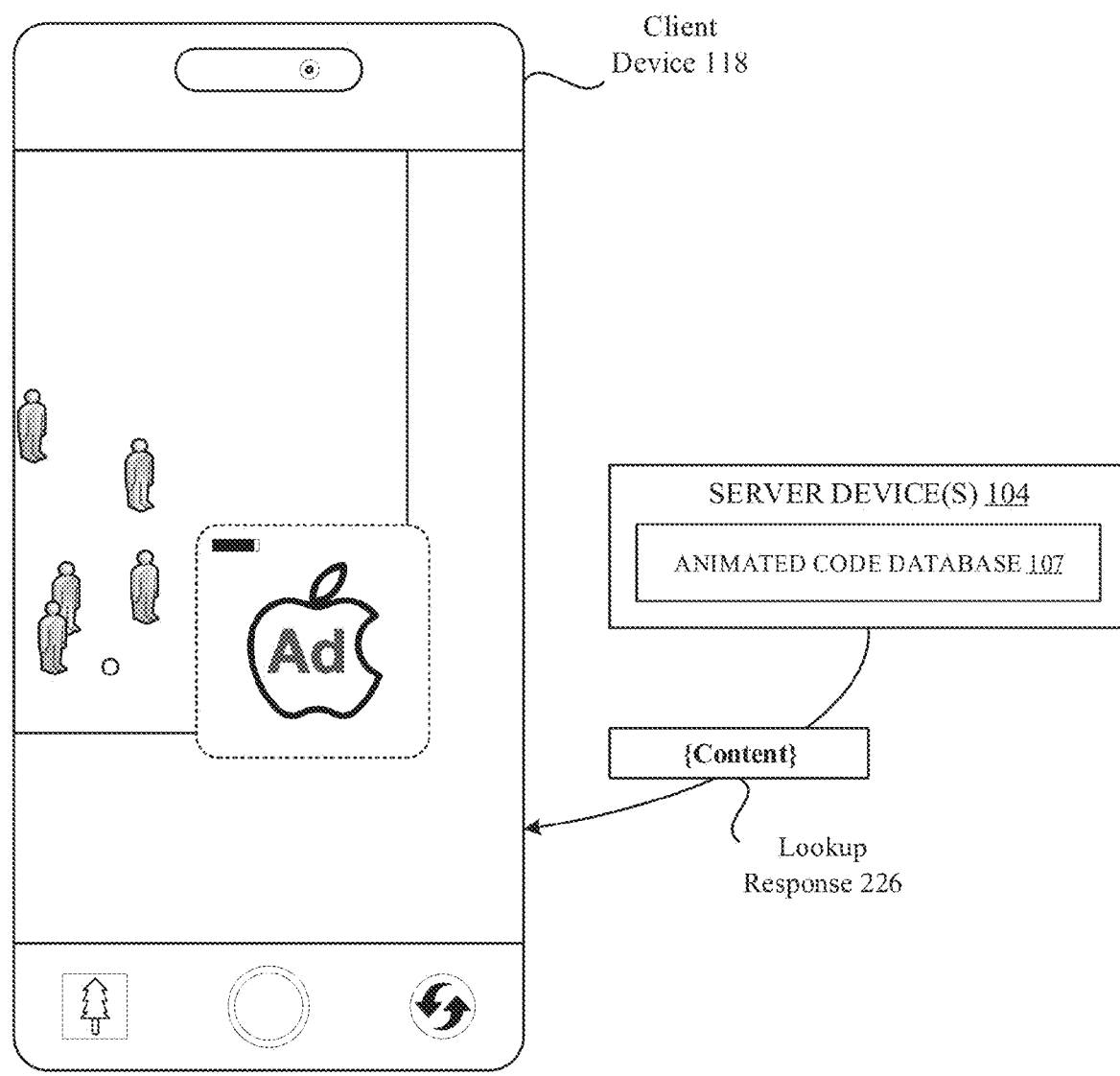
Figure 2P:
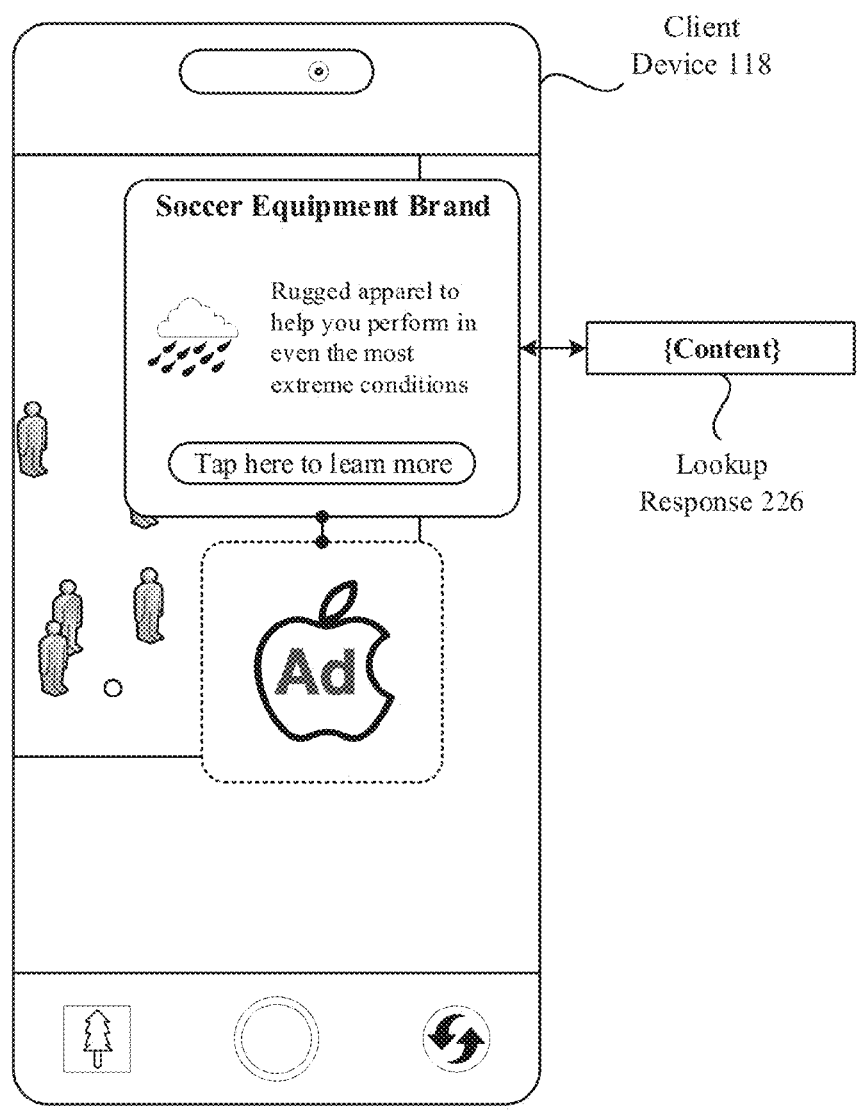

FIGS. 2A-2P illustrate conceptual diagrams of techniques for encoding information into animated codes 108, as well as decoding information from the animated codes 108, according to some embodiments. As shown in FIG. 2A, a first step involves a server computing device 104—specifically, an encoding engine 106 executing thereon—receiving a request to generate an animated code 108 for the string "ao.wmcnwidmow.". Here, the string "ao.wmcnwidmow." can represent a unique identifier that is generated by the server computing device 104 in response to receiving an encoding request 102 to generate the animated code 108. In this regard—and, although not illustrated in FIG. 2A—the encoding request 102 can include content information to be associated with the animated code 108/unique identifier within the animated code database 107. For example, the content information can include UI information for an advertisement for soccer apparel, the details of which are illustrated and described below in conjunction with FIG. 2P. As shown in FIG. 2A, the encoding engine 106 can parse the string into its individual characters in preparation for mapping each of the individual characters to respective and unique visual elements.

FIG. 2B illustrates a second step that involves the encoding engine 106 accessing a mapping table 202 that links characters to respective unique colors (i.e., visual elements). It is noted that the relevant colors—i.e., those that correspond to the characters included in the string "ao.wmcnwidmow."—are actively illustrated in FIG. 2B, while the irrelevant colors—i.e., those that correspond to characters not included in the string "ao.wmcnwidmow."—are omitted from the illustration of FIG. 2B in the interest of simplifying this disclosure. As a brief aside—and, as previously discussed herein—the visual elements are not limited only to colors. To the contrary, the visual elements can possess different shades, patterns, textures, designs, etc.—at any level of granularity, and having any number of visual characteristics, etc.—without departing from the scope of this disclosure. For example, the visual element for the character "d"—i.e., the color yellow—can instead be represented as a green crosshatch pattern. In another example, the visual element for the character "w"—i.e., the color purple—can instead be represented as a pattern of flowers. In yet another example, the visual element for the character "a"—i.e., the color red—can instead be represented as a black polka dots with a red background. In yet another example, the visual element for the character "c"—i.e., the color purple—can instead be represented as two colors: pink on the left, and turquoise on the right. It is noted that the foregoing examples are not meant to be limiting, and that each visual element described herein can take any visual form that makes the visual element unique and distinguishable from other unique elements.

FIG. 2C illustrates a third step that involves the encoding engine 106 mapping each character of the string "ao.wmcnwidmow." to the mapping table 202. As shown in FIG. 2C, the order of the characters in the string "ao.wmcnwidmow." is considered when performing the mapping, such that the corresponding visual elements will be ordered in the same manner. FIG. 2D illustrates a fourth step that involves the encoding engine 106 generating a color sequence 204 based on the mappings performed in conjunction with the third step of FIG. 2C. Here, and as shown in FIG. 2D, the color sequence 204 includes, for each character of the string "ao.wmcnwidmow.", the visual element (i.e., color) that corresponds to the character (as dictated by the mapping table 202). The visual elements are also ordered within the color sequence 204 in accordance with the order of the correspond characters in the string "ao.wmcnwidmow." (as noted above).

FIG. 2E illustrates a fifth step that involves the encoding engine 106 identifying that the animated code 108 simultaneously displays two containers 206—which, as shown in FIG. 2E, take the form of "A" and "d", respectively, to spell the word "Ad" (i.e., advertisement). As described herein, the animated code 108 illustrated in FIG. 2E can represent the default form that is implemented by encoding engine 106, a customized form specified by the entity that issued the encoding request 102, and so on. As also shown in FIG. 2E, the animated code 108 also includes a shape—specifically Apple, Inc.'s logo—that encapsulates the containers 206. Again, it is noted that any number, size, type, design, etc., of shapes can be included within the animated code 108 without departing from the scope of this disclosure. It is also noted that such shapes can be omitted from the animated code 108 (e.g., with the containers 206 remaining intact) without departing from the scope of this disclosure. It is further noted that any number, size, type, design, etc., of containers 206 can be included within the animated code 108 without departing from the scope of this disclosure. For example, the animated code 108 can be modified to incorporate additional containers to spell out longer words, such as a first container that takes the form of the letter "C", a second container that takes the form of the letter "o", a third container that takes the form of the letter "d", and a fourth container that takes the form of the letter "e", to effectively spell out the word "Code". In any case, in the example illustrated in FIG. 2E, the count (i.e., two) of the containers 206 included in the animated code 108 dictates the manner in which the color sequence 204 is segmented and incorporated into the animated code 108.

FIG. 2F illustrates a sixth step that involves the encoding engine 106 segmenting the color sequence 204 into groups of two (in accordance with the animated code 108 including two containers 206) to produce color sequence groups 205. FIG. 2G illustrates a seventh step that involves the encoding engine 106 generating frames 207 for the animated code 108 based on the color sequence groups 205. As shown in FIG. 2G, each frame 207 that corresponds to a given color sequence group 205 includes the shape of the animated code 108, as well as the containers 206 of the animated code 108, where the containers 206 are respectively formatted based on the visual elements included in the color sequence group 205. In this manner, the frames 207, in their entirety, capture the entirety of the color sequence groups 205, and share the same temporal flow of the color sequence groups 205.

FIG. 2H illustrates a seventh step that involves the encoding engine 106 compiling the frames together to produce an animated code 108. As shown in FIG. 2H, the animated code 108, when played back on an output device 116, shares the same temporal flow as the frames 207 relative to the color sequence groups 205. It is noted that the frames 207 can be compiled into the animated code 108 using any feasible approach, such as generating a video file based on the frames 207, generating a Graphics Interchange Format (GIF) file based on the frames 207, generating an animated portable network graphics (APNG) file based on the frames 207, generating a WebP file based on the frames 207, generating an AVIF file based on the frames 207, generating a multiple-image network graphics (MNG) file based on the frames 207, generating a free lossless image format (FLIF) based on the frames 207, and so on. It is noted that the foregoing examples are not meant to be limiting, and that any approach for generating and storing the animated code 108 based on the frames 207 can be utilized without departing from the scope of this disclosure. As previously described herein, the animated code 108 can also include information to indicate that the animated code 108 should play in a loop.

FIG. 2I illustrates a nineth step that involves the server computing device 104, media content manager 110, etc., integrating the animated code 108 into media content 114 (e.g., as described above in conjunction with FIG. 1). For example, the animated code 108 can be integrated into existing media content, media content that is being livestreamed, and so on. According to some embodiments, the animated code 108 can be modified based on the destination output device 116 on which the animated code 108 will be displayed in order to maximize the overall noticeability, readability, etc., of the animated code 108. For example, when the animated code 108 is being displayed on a lower resolution display—such that the animated code is inherently displayed with coarse-granularity pixelation—then the animated code 108 can be enlarged so that it will be noticeable to users, so that the sensor(s) 120 on client computing devices 118 are able to effectively scan the animated code 108, and so on. Similarly, when the animated code 108 is being displayed on a higher resolution display—such that the animated code is inherently displayed at a smaller size—then the animated code 108 can also be enlarged so that it will be noticeable to users, so that the sensor(s) 120 on the client computing devices 118 are able to effectively scan the animated code, and so on. This enlargement is captured in the illustration of FIG. 2I, which shows media content 114 in which an enlarged version of the animated code 108 is displayed (relative to the size of the frames 207 from which the animated code 108) is derived.

FIG. 2J illustrates a tenth step, as well as a transition from discussing the functionalities performed by the server computing devices 104/encoding engines 106, to discussing the functionalities performed by the client computing devices 118/decoding engines 122. As shown in FIG. 2J, a client computing device 118 is positioned near the output device 116 such that the sensor(s) 120 of the client computing device 118 can effectively scan the animated code 108 being displayed on the output device 116. As shown in FIG. 2J, a user interface of the client computing device 118 can be updated to include a bounding box around the animated code 108 to indicate to the user that the animated code 108 has been detected and is being processed. During this process, the sensor(s) 120 of the client computing device 118, and/or other hardware/software included therein, can identify the aforementioned loop point of the animated code to effectively capture the starting frame of the animated code 108 through the ending frame of the animated code 108. In turn, and as illustrated in FIG. 2K, an eleventh step can involve the client computing device 118/decoding engine 122 separating the animated code 108 into the frames 220, which match the frames 207 from which the animated code 108 was originally derived.

FIG. 2L illustrates a twelfth step that involves the decoding engine 122 determining, based on analyzing one or more of the frames 220, that the animated code 108 includes two separate and distinct containers 206. In response, the decoding engine 122 generates a color sequence 222 from the frames 220, where the color sequence 222 matches the color sequence 204 generated by the server computing device 104/encoding engine 106. The color sequence 222 also matches the temporal flow of the frames 220.

FIG. 2M illustrates a thirteenth step that involves the decoding engine 122 providing the color sequence 222 to the mapping table 202, which effectively constitutes an inverse of the process carried out in the fourth step discussed above in conjunction with FIG. 2D. In particular, each visual element included in the color sequence 222 is mapped to a corresponding character (as dictated by the mapping table 202). The extracted characters—which form the string "ao.wmcnwidmow."—are also ordered in accordance with the order of the corresponding virtual elements included in the color sequence 222. Accordingly, at the conclusion of the thirteenth step performed in FIG. 2M, the client computing device 118 is in possession of the same unique identifier that was originally generated by the server computing device 104 and encoded into the animated code 108.

FIG. 2N illustrates a fourteenth step that involves the client computing device 118 issuing a lookup request 224 to receive content information associated with the string "ao.wmcnwidmow.". It is noted that the lookup request 224 illustrated in FIG. 2N is performed in alignment with the example scenario discussed in conjunction with FIGS. 2A-2P, which involve the animated code 108 being encoded with a unique identifier (i.e., the string "ao.wmcnwidmow.") that is linked to soccer apparel content information (as opposed to the animated code 108 being encoded with intrinsic information (e.g., a URL, contact information, etc.) upon which the client computing device 118 can independently act). In this regard, the lookup request 224 can be issued directly to the animated code database 107 (when permitted), directly to a server computing device 104 (that can then interface with the animated code database 107) to process the request and return a response, directly to another controlling entity that has access to the animated code database 107, and so on. As shown in FIG. 2N, the user interface displayed on the client computing device 118 can also include a progress bar to indicate that activity is taking place based on the animated code 108, including identifying the content information that corresponds to the animated code 108.

FIG. 2O illustrates a fifteenth step that involves the client computing device 118 receiving, from the animated code database 107 (or from another computing device on behalf of the animated code database 107), a lookup response 226 that includes the content information associated with the animated code 108/string "ao.wmcnwidmow.". In turn, a sixteenth step illustrated in FIG. 2P involves the client computing device 118 displaying the content information received in conjunction with the fifteenth step of FIG. 2O. As shown in FIG. 2O, the content information can cause the client computing device 118 to display a "card" user interface (UI) element that is linked to the animated code 108 and provides a visual breakdown of the content information. Again, it is noted that the illustrations depicted throughout FIGS. 2A-2P are merely exemplary, and that the client computing devices 118 can be configured to display the content information in any format, take any number of actions in response to the content information, and so on. For example, as shown in FIG. 2P, the card UI element can display content information about a soccer apparel advertisement, and include a UI button that can be tapped by a user of the client computing device 118 to provoke additional actions to be performed, such as loading a webpage linked to the advertisement, bookmarking the advertisement for later review, sharing the advertisement with other individuals, and so on. It is noted that the foregoing examples are not meant to be limiting, and that any approach for displaying/interacting with the content information can be implemented without departing from the scope of this disclosure.

Accordingly, FIGS. 2A-2P illustrate conceptual diagrams of the manner in which information can be encoded into, and decoded from, animated codes 108, according to some embodiments. High-level breakdowns of the manners in which the entities discussed in conjunction with FIGS. 1 and 2A-2P can interact with one another will now be provided below in conjunction with FIGS. 3-4.

Figure 3:
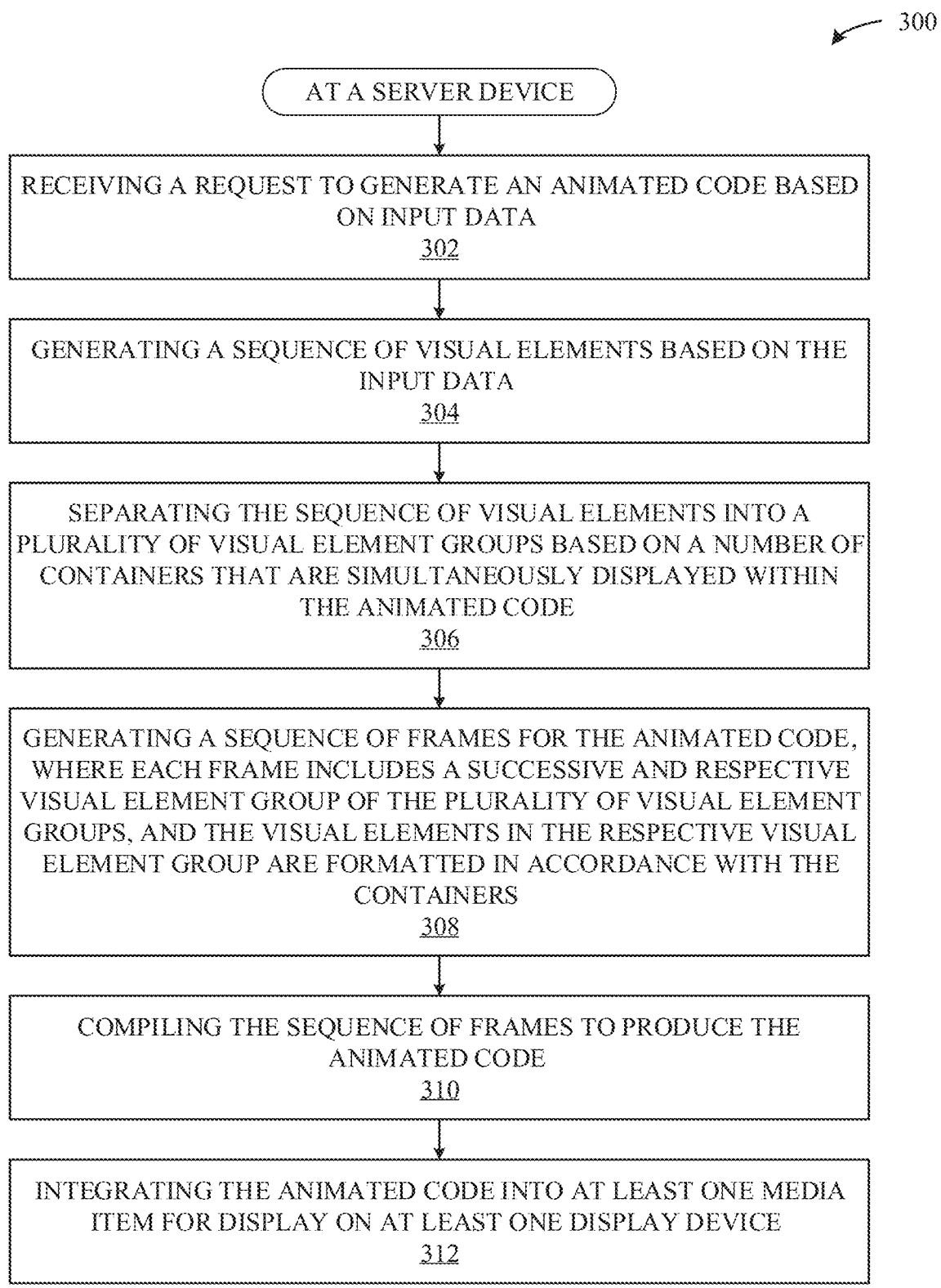
FIG. 3 illustrates a method for encoding information into animated codes, according to some embodiments.

FIG. 3 illustrates a method 300 for encoding information into animated codes, according to some embodiments. As shown in FIG. 3, the method 300 begins at step 302, where the server computing device 104 receives a request to generate an animated code based on input data (e.g., as described above in conjunction with FIGS. 1 and 2A-2P). At step 304, the server computing device 104 generates a sequence of visual elements based on the input data (e.g., as also described above in conjunction with FIGS. 1 and 2A-2P). At step 306, the server computing device 104 separates the sequence of visual elements into a plurality of visual element groups based on a number of containers that are simultaneously displayed within the animated code (e.g., as also described above in conjunction with FIGS. 1 and 2A-2P).

At step 308, the server computing device 104 generates a sequence of frames for the animated code, where each frame includes a successive and respective visual element group of the plurality of visual element groups, and the visual elements in the respective visual element group are formatted in accordance with the containers (e.g., as also described above in conjunction with FIGS. 1 and 2A-2P). At step 310, the server computing device 104 compiles the sequence of frames to produce the animated code (e.g., as also described above in conjunction with FIGS. 1 and 2A-2P). At step 312, the server computing device 104 integrates the animated code into at least one media item for display on at least one display device (e.g., as further described above in conjunction with FIGS. 1 and 2A-2P).

Figure 4:
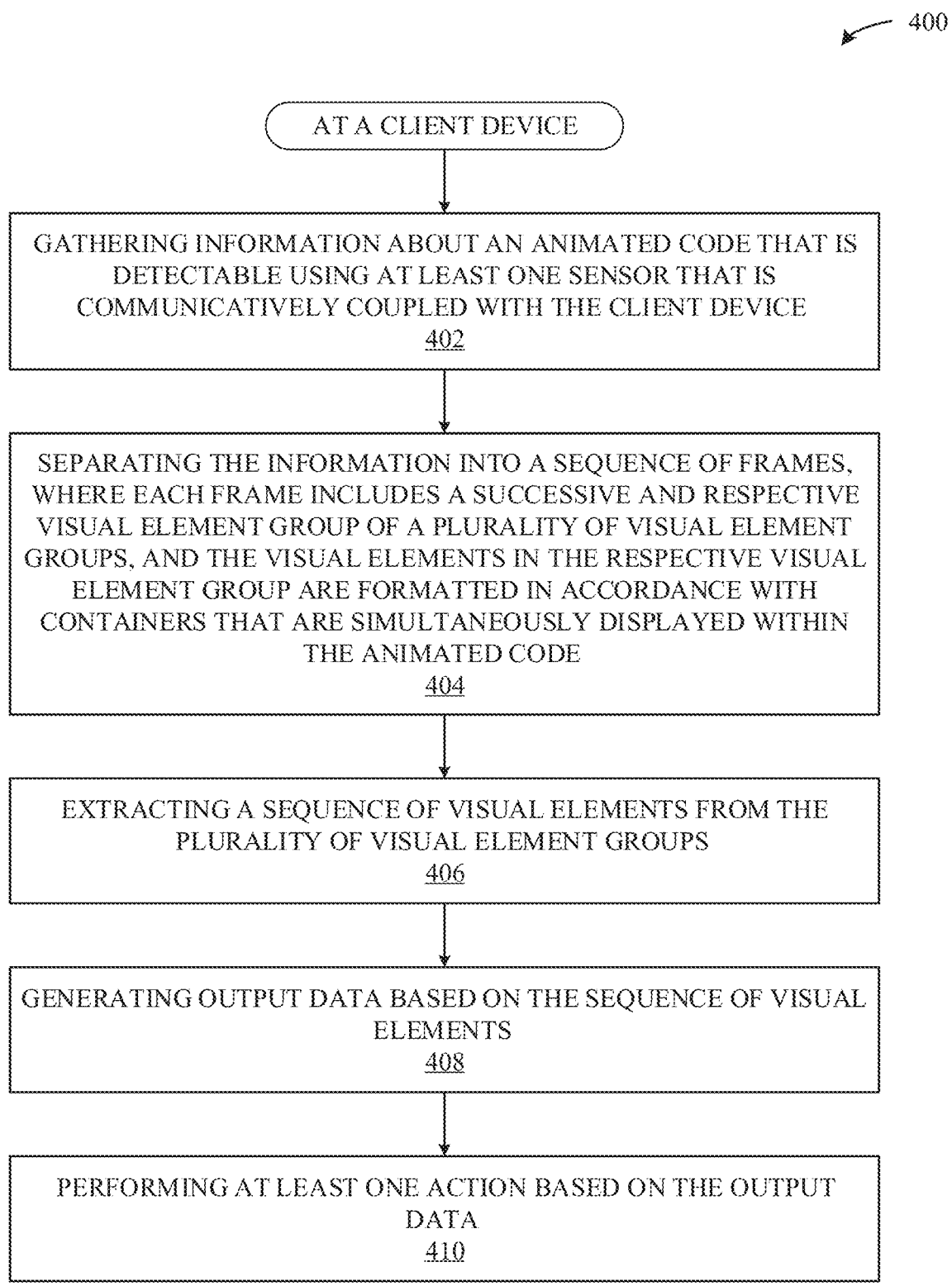
FIG. 4 illustrates a method for decoding information from animated codes, according to some embodiments.

FIG. 4 illustrates a method 400 for decoding information from animated codes, according to some embodiments. As shown in FIG. 4, the method 400 begins at step 402, where the client computing device 118 gathers information about an animated code that is detectable using at least one sensor that is communicatively coupled with the client device (e.g., as described above in conjunction with FIGS. 1 and 2A-2P). At step 404, the client computing device 118 separates the information into a sequence of frames, where each frame includes a successive and respective visual element group of a plurality of visual element groups, and the visual elements in the respective visual element group are formatted in accordance with containers that are simultaneously displayed within the animated code (e.g., as also described above in conjunction with FIGS. 1 and 2A-2P).

At step 406, the client computing device 118 extracts a sequence of visual elements from the plurality of visual element groups (e.g., as also described above in conjunction with FIGS. 1 and 2A-2P). At step 408, the client computing device 118 generates output data based on the sequence of visual elements (e.g., as also described above in conjunction with FIGS. 1 and 2A-2P). At step 410, the client computing device 118 performs at least one action based on the output data (e.g., as further described above in conjunction with FIGS. 1 and 2A-2P).

Figure 5:
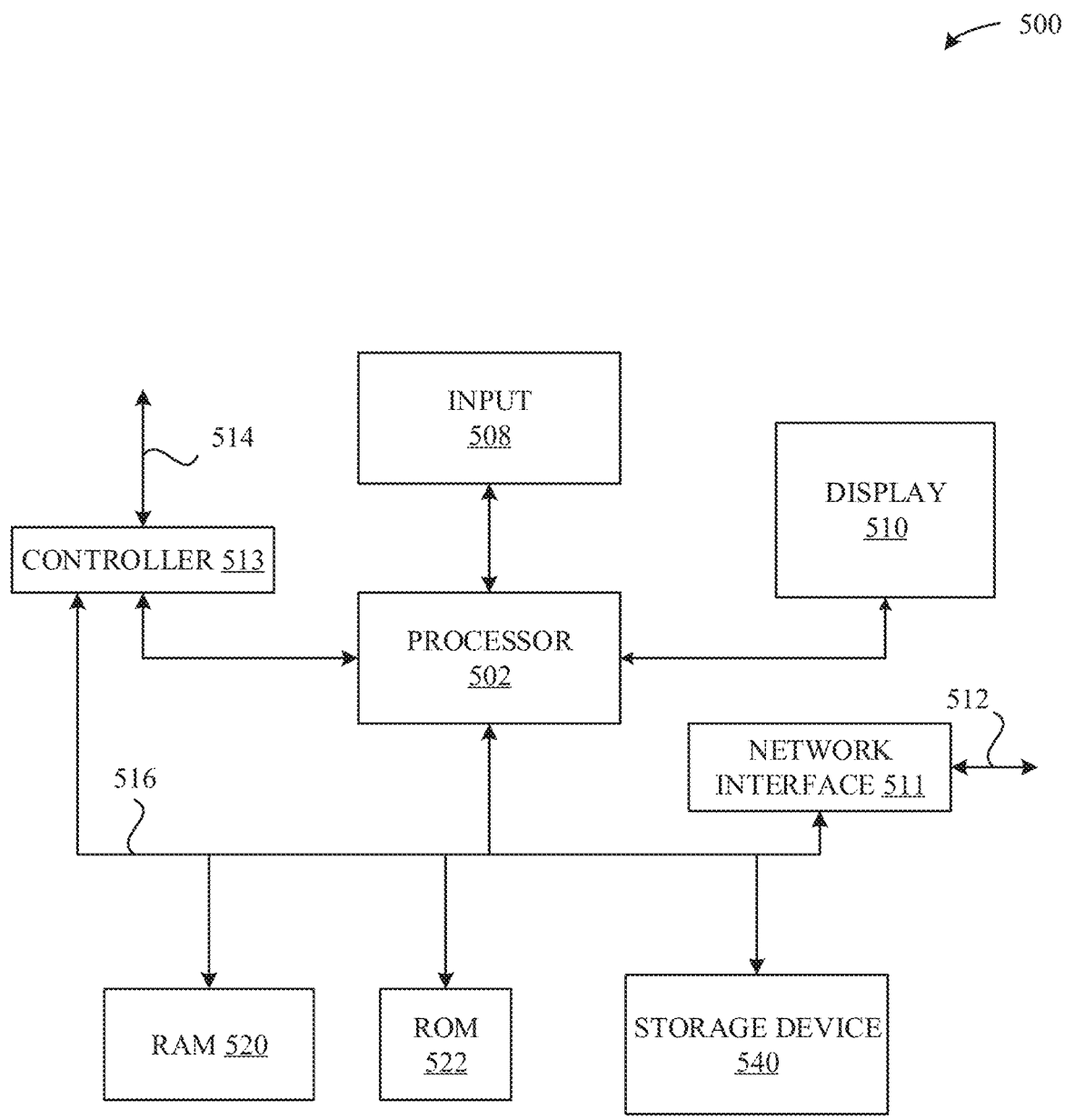
FIG. 5 illustrates a detailed view of a computing device that can be used to implement the various techniques described herein, according to some embodiments.

FIG. 5 illustrates a detailed view of a computing device 500 that can be used to implement the various techniques described herein, according to some embodiments. In particular, the detailed view illustrates various components that can be included in the computing devices described in conjunction with FIG. 1. As shown in FIG. 5, the computing device 500 can include a processor 502 that represents a microprocessor or controller for controlling the overall operation of the computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, and so on. Still further, the computing device 500 can include a display 510 that can be controlled by the processor 502 (e.g., via a graphics component) to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that couples to a data link 512. In the case of a wireless connection, the network/bus interface 511 can include a wireless transceiver.

As noted above, the computing device 500 also includes the storage device 540, which can comprise a single disk or a collection of disks (e.g., hard drives). In some embodiments, storage device 540 can include flash memory, semiconductor (solid-state) memory or the like. The computing device 500 can also include a Random-Access Memory (RAM) 520 and a Read-Only Memory (ROM) 522. The ROM 522 can store programs, utilities, or processes to be executed in a non-volatile manner. The RAM 520 can provide volatile data storage, and stores instructions related to the operation of applications executing on the computing device 500.

The various aspects, embodiments, implementations, or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The terms "a," "an," "the," and "said" as used herein in connection with any type of processing component configured to perform various functions may refer to one processing component configured to perform each and every function, or a plurality of processing components collectively configured to perform the various functions. By way of example, "A processor" configured to perform actions A, B, and C may refer to one or more processors configured to perform actions A, B, and C. In addition, "A processor" configured to perform actions A, B, and C may also refer to a first processor configured to perform actions A and B, and a second processor configured to perform action C. Further, "A processor" configured to perform actions A, B, and C may also refer to a first processor configured to perform action A, a second processor configured to perform action B, and a third processor configured to perform action C.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

What is claimed is:

1. A method for encoding information into animated codes, the method comprising, by a server computing device:
   receiving a request to generate an animated code based on input data;
   adjusting the input data to include forward error correcting information;
   generating a sequence of visual elements based on the input data;
   separating the sequence of visual elements into a plurality of visual element groups based on a number of containers that are included within the animated code, wherein at least one of the containers comprise modifiable symbols;
   generating a sequence of frames for the animated code, wherein:
      a given frame of the sequence of frames includes a successive and respective visual element group of the plurality of visual element groups,
      the visual elements in the respective visual element group are formatted in accordance with the containers, and
      the containers are consistently displayed across the sequence of frames;
   compiling the sequence of frames to produce the animated code; and
   integrating the animated code into at least one media item for display on at least one display device.

2. The method of claim 1, wherein the request further includes a selection of the number of containers.

3. The method of claim 2, wherein the symbols have adjustable shade, color, pattern, texture, and/or design properties.

4. The method of claim 1, wherein generating the sequence of visual elements based on the input data comprises:
   segmenting the input data into a plurality of segments, and
   mapping a given segment of the plurality of segments to a respective visual element that corresponds to the segment.

5. The method of claim 4, wherein:
   the input data comprises a string of characters, and
   a given segment of the plurality of segments comprises a respective character in the string of characters.

6. The method of claim 4, wherein for a given segment of the plurality of segments, the respective visual element comprises a unique shade, color, pattern, texture, and/or design.

7. At least one non-transitory computer readable storage medium configured to store instructions that, when executed by at least one processor included in a server computing device, cause the server computing device to encode information into animated codes, by carrying out steps that include:
   receiving a request to generate an animated code based on input data;
   adjusting the input data to include forward error correcting information;
   generating a sequence of visual elements based on the input data;
   separating the sequence of visual elements into a plurality of visual element groups based on a number of containers that are included within the animated code, wherein at least one of the containers comprise modifiable symbols;
   generating a sequence of frames for the animated code, wherein:
      a given frame of the sequence of frames includes a successive and respective visual element group of the plurality of visual element groups,
      the visual elements in the respective visual element group are formatted in accordance with the containers, and
      the containers are consistently displayed across the sequence of frames;
   compiling the sequence of frames to produce the animated code; and
   integrating the animated code into at least one media item for display on at least one display device.

8. The at least one non-transitory computer readable storage medium of claim 7, wherein the request further includes a selection of the number of containers.

9. The at least one non-transitory computer readable storage medium of claim 8, wherein the symbols have adjustable shade, color, pattern, texture, and/or design properties.

10. The at least one non-transitory computer readable storage medium of claim 7, wherein generating the sequence of visual elements based on the input data comprises:
    segmenting the input data into a plurality of segments, and
    mapping a given segment of the plurality of segments to a respective visual element that corresponds to the segment.

11. The at least one non-transitory computer readable storage medium of claim 10, wherein:
    the input data comprises a string of characters, and
    a given segment of the plurality of segments comprises a respective character in the string of characters.

12. The at least one non-transitory computer readable storage medium of claim 10, wherein for a given segment of the plurality of segments, the respective visual element comprises a unique shade, color, pattern, texture, and/or design.

13. A method for decoding information from animated codes, the method comprising, by a client computing device:
    gathering information about an animated code that is detectable using at least one sensor that is communicatively coupled with the client computing device;
    separating the information into a sequence of frames, wherein:

a given frame of the sequence of frames includes a successive and respective visual element group of a plurality of visual element groups, visual elements in the respective visual element group are formatted in accordance with a number of containers that are included within the animated code, wherein at least one of the containers comprise modifiable symbols, and the containers are included within and consistently displayed across the sequence of frames;

extracting a sequence of visual elements from the plurality of visual element groups;

generating output data based on the sequence of visual elements;

extracting forward error correcting information from the output data; and performing at least one action based on the output data.

14. The method of claim 13, wherein the at least one action comprises:

providing the output data to a server computing device; and receiving additional data from the server computing device, wherein the additional data is based on the output data.

15. The method of claim 13, wherein the symbols have adjustable shade, color, pattern, texture, and/or design properties.

16. The method of claim 13, wherein generating output data based on the sequence of visual elements comprises:

mapping a given visual element of the sequence of visual elements to a respective segment of a plurality of segments, and compiling the plurality of segments into the output data.

17. The method of claim 16, wherein:

the output data comprises a string of characters, and a given segment of the plurality of segments comprises a respective character in the string of characters.

18. The method of claim 16, wherein for a given segment of the plurality of segments, the respective visual element comprises a unique shade, color, pattern, texture, and/or design.

* * * * *